United States Patent
Ikarashi et al.

(10) Patent No.: US 10,867,018 B2
(45) Date of Patent: Dec. 15, 2020

(54) SECURE COMPUTATION SYSTEM, SECURE COMPUTATION DEVICE, SECURE COMPUTATION METHOD, AND PROGRAM

(71) Applicant: NIPPON TELEGRAPH AND TELEPHONE CORPORATION, Chiyoda-ku (JP)

(72) Inventors: Dai Ikarashi, Musashino (JP); Koji Chida, Musashino (JP); Koki Hamada, Musashino (JP); Ryo Kikuchi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 320 days.

(21) Appl. No.: 15/745,595

(22) PCT Filed: Jul. 20, 2016

(86) PCT No.: PCT/JP2016/071221
§ 371 (c)(1),
(2) Date: Jan. 17, 2018

(87) PCT Pub. No.: WO2017/018285
PCT Pub. Date: Feb. 2, 2017

(65) Prior Publication Data
US 2018/0225431 A1     Aug. 9, 2018

(30) Foreign Application Priority Data
Jul. 27, 2015 (JP) .................... 2015-147774

(51) Int. Cl.
*G06F 21/30* (2013.01)
*G06F 21/60* (2013.01)
(Continued)

(52) U.S. Cl.
CPC .............. *G06F 21/30* (2013.01); *G06F 21/60* (2013.01); *G06F 21/64* (2013.01); *G09C 1/00* (2013.01);
(Continued)

(58) Field of Classification Search
CPC .......... G06F 21/30; G06F 21/60; G06F 21/64; H04L 9/085; G09C 1/00
See application file for complete search history.

(56) References Cited

U.S. PATENT DOCUMENTS

2011/0138454 A1* 6/2011 Mansour ........... H04W 12/0608
726/9
2014/0130173 A1* 5/2014 Kerschbaum ......... G06F 21/125
726/26

(Continued)

FOREIGN PATENT DOCUMENTS

EP     0 723 348 A2    7/1996
JP     2014-137474 A    7/2014

OTHER PUBLICATIONS

Powers et al., "Secure Computation of Top-K Eigenvectors for Shared Matrices in the Cloud," 2013 IEEE Sixth International Conference on Cloud Computing Year: 2013 | Conference Paper | Publisher: IEEE.*

(Continued)

*Primary Examiner* — Roderick Tolentino
(74) *Attorney, Agent, or Firm* — Oblon, McClelland, Maier & Neustadt, L.L.P.

(57) ABSTRACT

A secret share value of object data on which secure computation is to be performed is stored in a secure computation device, and a query which requests secure computation or secret share value of the query is input to the secure computation device. The secure computation device performs consistency verification of the secret share value of the object data and consistency verification of the query or (Continued)

the secret share value of the query, obtains a secret share value of a calculation result by performing secure computation in accordance with the query or the secret share value of the query which passed the consistency verification by using the secret share value of the object data which passed the consistency verification, and outputs the secret share value of the calculation result.

17 Claims, 10 Drawing Sheets

(51) Int. Cl.
    *G06F 21/64*      (2013.01)
    *G09C 1/00*      (2006.01)
    *H04L 9/08*      (2006.01)

(52) U.S. Cl.
    CPC ............ *H04L 9/085* (2013.01); *H04L 9/08* (2013.01); *H04L 2209/46* (2013.01)

(56) References Cited

U.S. PATENT DOCUMENTS

| | | | | |
|---|---|---|---|---|
| 2014/0173270 A1* | 6/2014 | Matsuo | ............... | H04L 9/0869 713/150 |
| 2014/0281512 A1* | 9/2014 | Arasu | ............... | H04L 63/062 713/165 |
| 2014/0281578 A1* | 9/2014 | Bennison | ............ | G06F 21/6227 713/189 |
| 2015/0213079 A1* | 7/2015 | Shukla | ............... | G16B 50/00 707/687 |
| 2015/0349958 A1* | 12/2015 | Lindell | ............... | H04L 9/3228 713/168 |
| 2018/0139045 A1* | 5/2018 | Furukawa | ............... | H04L 63/06 |
| 2018/0276417 A1* | 9/2018 | Cerezo Sanchez | ..... | G06F 21/74 |

OTHER PUBLICATIONS

Wang et al., "Efficient Attribute-Based Comparable Data Access Control," IEEE Transactions on Computers Year: 2015 | vol. 64, Issue: 12 | Journal Article | Publisher: IEEE.*

Masanori Shimura, et al., "Relational Algebra in Multi-party Protocol to Enable Structural Operation in Secret Shared Databases," Information Processing Society of Japan, vol. 51, No. 9, Sep. 15, 2010, (pp. 1563-1578) (with English abstract).

Ryo Kikuchi, et al., "MEVAL2: A Practically Efficient MPC System with Unanimous Abort," SCIS 2015, The $32^{nd}$ Symposium on Cartography and Information Security, Jan. 20-23, 2015, pp. 1-8 (with partial English translation).

Tatsuaki Okamoto, et al., "Modern Cryptography-Series/ Mathematics in Information Science", Sangyo Tosho Co., Ltd., Second impression, Jun. 30, 1998, pp. 217-219 (with partial English translation).

Adi Shamir, "How to Share a Secret," Communications of the ACM, vol. 22, No. 11, Nov. 1979, pp. 612-613.

Dai Ikarashi, et al., "An Extremely Efficient Secret-sharing-based Multi-Party Computation against Malicious Adversary," SCIS 2013, The $30^{th}$ Symposium on Cryptography and Information Security, Jan. 21, 2013, pp. 1-8 (corresponding to Dai Ikarashi, et al., "Actively Private and Correct MPC Scheme in t<n/2 from Passively Secure Schemes with Small Overhead", 18 pages).

International Search Report dated Aug. 16, 2016 in PCT/JP2016/ 071221 filed on Jul. 20, 2016.

Office Action dated Aug. 16, 2016 in Japanese Patent Application No. 2015-147774 filed Jul. 27, 2015, (12 pages) (with English Translation).

Extended European Search Report issued on Jan. 23, 2019 in Patent Application No. 16830390.7, citing documents AO and AV-AX therein, 9 pages.

Lein Ham, et al., "Strong (n, t, n) Verifiable Secret Sharing Scheme" Information Sciences, vol. 180, No. 16, XP027066561, Aug. 15, 2010, pp. 3059-3064.

Sven Laur, et al., "Round-Efficient Oblivious Database Manipulation" International conference on Simulation, Modeling and Programming for Autonomous Robots, SIMPAR 2010, XP019167784, Jan. 1, 2011, pp. 262-277.

Matthias Fitzi, et al., "Round-Optimal and Efficient Verifiable Secret Sharing" In: "Serious Games", Springer International Publishing, vol. 3876, XP055541990, Jan. 1, 2006, pp. 1-13.

Combined Chinese Office Action and Search Report dated Aug. 3, 2020 in Patent Application No. 201680042855.8 (with English language translation), 15 pages.

Koji Chide, et al., "Cloud Business o Sasaeru Security Kiban Gijutsu," NTT Gijutsu Journal, vol. 26, No. 3, Mar. 2014, pp. 67-70.

* cited by examiner

SECURE COMPUTATION SYSTEM, SECURE COMPUTATION DEVICE, SECURE COMPUTATION METHOD, AND PROGRAM

TECHNICAL FIELD

The present invention relates to an information security technology to which a cryptographic technology has been applied and, in particular, to a secure computation technology.

BACKGROUND ART

As a technology to detect falsification of secret share values, there is verifiable secret sharing (VSS) (for example, Non-patent Literature 1).

PRIOR ART LITERATURE

Non-Patent Literature

Non-patent Literature 1: Tatsuaki Okamoto, Hirosuke Yamamoto, "Modern Cryptography-Series/Mathematics in Information Science", Sangyo Tosho Co., Ltd., Jun. 30, 1998, second impression, pp. 217-219.

SUMMARY OF THE INVENTION

Problems to be Solved by the Invention

However, there is no known method of preventing fraud by falsification under the situation that secret share values of object data on which secure computation is to be performed are stored in secure computation devices and the secure computation devices perform secure computation in accordance with an input query or secret share values of the query by using these secret share values of the object data.

An object of the present invention is to prevent fraud by falsification under the situation that the secret share values of the object data on which the secure computation is to be performed are stored in the secure computation devices and the secure computation devices perform secure computation in accordance with the input query or the secret share values of the query by using these secret share values of the object data.

Means to Solve the Problems

Secret share values of object data on which secure computation is to be performed are stored in secure computation devices, and a query which requests secure computation or secret share values of the query are input to the secure computation devices. The secure computation devices perform consistency verification of the secret share values of the object data and consistency verification of the query or the secret share values of the query, obtain secret share values of a calculation result by performing secure computation in accordance with the query or the secret share values of the query which passed the consistency verification by using the secret share values of the object data which passed the consistency verification, and output the secret share values of the calculation result.

Effects of the Invention

As a result, it is possible to prevent fraud by falsification under the situation that the secret share values of object data on which secure computation is to be performed are stored in the secure computation devices and the secure computation devices perform the secure computation in accordance with the input query or the secret share values of the query by using these secret share values of the object data.

DETAILED DESCRIPTION OF THE EMBODIMENTS

Figure 1:
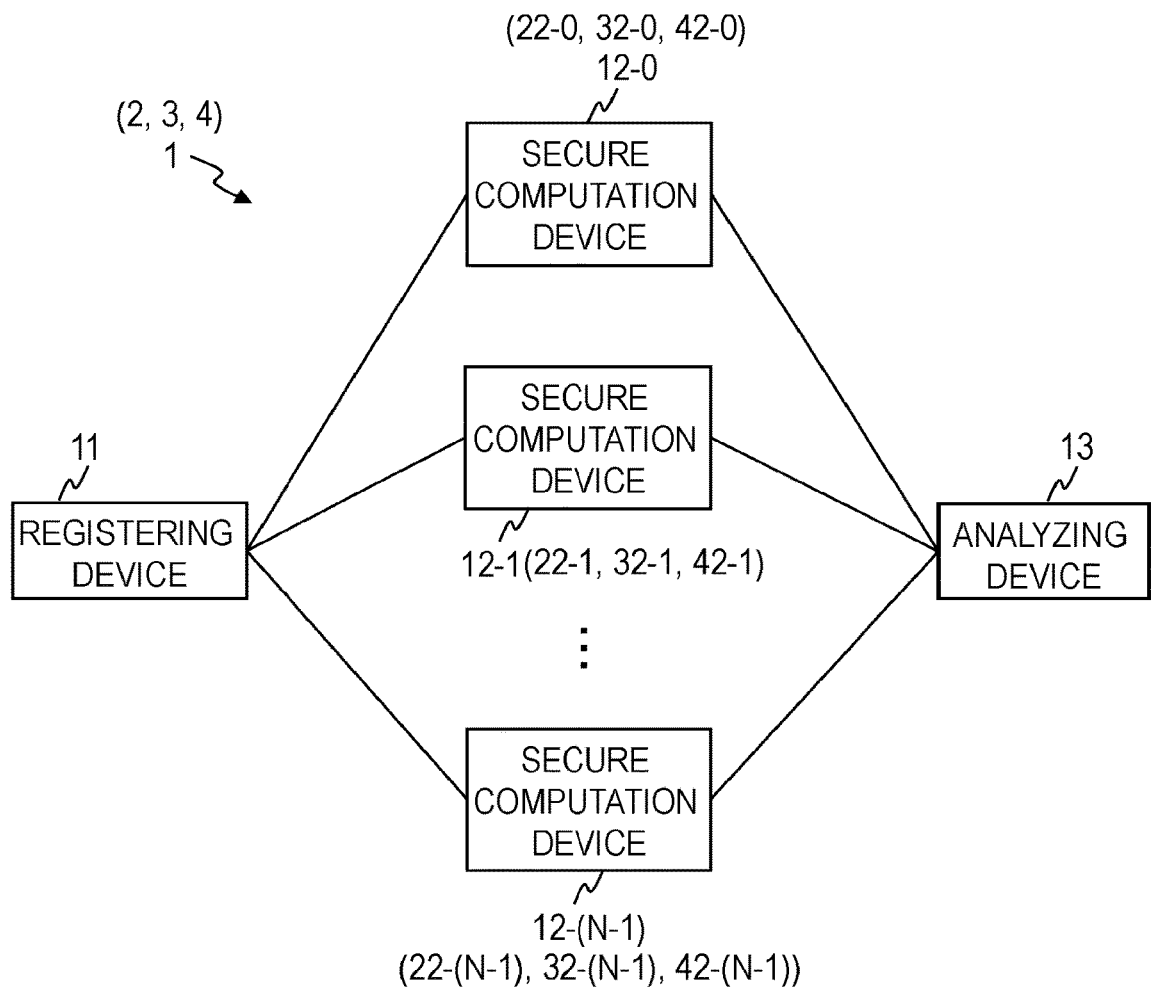
FIG. 1 is a block diagram illustrating the functional configuration of a secure computation system of an embodiment.

Hereinafter, embodiments of the present invention will be described.

[General Outline]

First, the general outline of an embodiment will be described.

A secure computation system of the embodiment includes a registering device that outputs secret share values of object data on which secure computation is to be performed, a plurality of secure computation devices, and an analyzing device that requests secure computation by using a query or secret share values of the query. The secret share values of the object data sent from the registering device are stored in the respective secure computation devices, and the query or the secret share values of the query sent from the analyzing device are input thereto. The respective secure computation devices perform consistency verification of the secret share values of the object data and consistency verification of the query or the secret share value of the query, obtain secret share values of a calculation result by performing secure computation in accordance with the query or the secret share values of the query which passed the consistency verification, by using the secret share values of the object data which passed the consistency verification, and output the secret share values of the calculation result. As a result, even when the secret share values of the object data are falsified in the registering device, between the registering device and the secure computation devices, or in the secure computation devices, or the query or the secret share values of the query are falsified in the analyzing device or between the analyzing device and the secure computation devices, it is possible to prevent incorrect results from being output from the secure computation devices due to the falsification.

If any consistency verification failed, all of the operations to store the secret share values of the object data in the secure computation devices and/or all of the operations to input the query or the secret share values of the query to the secure computation devices may be performed again. Alternatively, only some secure computation devices in which the consistency verification of both of the secret share values of the object data and the query or the secret share values of the query were successful may output the secret share values of the calculation result. In the latter case, each of the secure computation devices belonging to an "intersection" of a "first set" and a "second set" outputs the secret share value of the calculation result. The members of the first set are secure computation devices storing the secret share values of the object data which passed the consistency verification (the consistency verification was successful), among the plurality of secure computation devices. The members of the second set are secure computation devices to which the query or the secret share values of the query which passed the consistency verification were input, among the plurality of secure computation devices. At least one of the "first set" and the "second set" may be a proper subset of a "universal set" whose members are the plurality of secure computation devices. This makes it possible to reduce the amount of processing in case where the consistency verification is failed.

When at least one of the "first set" and the "second set" is a proper subset of the "universal set", the "intersection" is also a proper subset of the "universal set". Depending on the details of secure computation, there are a case (Case 1) in which the secure computation can be executed by only secure computation devices of a proper subset of the "universal set" and a case (Case 2) in which the secure computation cannot be executed without cooperation with the secure computation devices of the "universal set". In "Case 1", the secure computation can be performed in only the "intersection". On the other hand, in "Case 2", secure computation cannot be performed in only the "intersection" and, if secure computation is performed in cooperation with secure computation devices in which consistency verification was failed, incorrect results may be obtained. Thus, a secure computation device belonging to the "intersection" may reconstruct at least one of the secret share value of the object data and the query or the secret share value of the query of a secure computation device belonging to a "complementary set" of the "intersection" (a set obtained by removing the "intersection" from the "universal set"). In accordance with the details of secure computation, the secret share value of the object data and the query or the secret share value of the query may be reconstructed or only the secret share value of the object data or the query or the secret share value of the query may be reconstructed. As a result, even in "Case 2", the secure computation can be performed in only the "intersection".

Secure computation devices belonging to the "intersection" may output the secret share values of the calculation result if the number of members of the "intersection" is greater than or equal to the required number of secret share values for reconstruction of the calculation result. This makes it possible to prevent calculation of the secret share values of the calculation result and communication from being performed when the required number of "secret share values of the calculation result" for reconstruction of the calculation result cannot be obtained. If the number of members of the "intersection" is smaller than the required number of secret share values for reconstruction of the calculation result, secure computation devices belonging to the "intersection" may again store the secret share values of the object data and/or accept input of the query or the secret share values of the query or may terminate processing with an error message.

When consistency verification which was performed among a plurality of secure computation devices was failed, while it is clear that "data" (a secret share value of object data or a query or a secret share value of the query) of any one of the secure computation devices has been falsified, it is not known which "data" has been falsified. Thus, when the secret share value of the object data did not pass the consistency verification (the consistency verification failed) which was performed among a "first subset" of the "universal set", recurrence processing may be performed, the recurrence processing by which a proper subset of the "first subset" is set as a new "first subset" and consistency verification of the secret share value of the object data is performed among the new "first subset". For instance, the "first subset" may be divided into a plurality of proper subsets, and each proper subset may be used as a new "first subset" or only one of the proper subsets of the "first subset" may be used as a new "first subset". Likewise, when the query or secret share value of the query did not pass the consistency verification which was performed among a "second subset" of the "universal set", recurrence processing may be performed, the recurrence processing by which a proper subset of the "second subset" is set as a new "second subset" and consistency verification of the query or the secret share value of the query is performed among the new "second subset". For example, the "second subset" may be divided into a plurality of proper subsets, and each proper subset may be used as a new "second subset" or only one of the proper subsets of the "second subset" may be used as a new "second subset". This makes it possible to identify the above-described "first set" and/or "second set" efficiently.

When the secret share value of the object data did not pass the consistency verification which was performed among a "third subset" of the "universal set", recurrence processing may be performed, the recurrence processing by which a sum set of a proper subset of the "third subset" and a subset of a complementary set of the "third subset" (a set obtained by removing the "third subset" from the "universal set") is set as a new "third subset" and consistency verification of the secret share value of the object data is performed among the new "third subset". Likewise, when the query or the secret share value of the query did not pass the consistency verification performed among a "fourth subset" of the "universal set", recurrence processing may be performed, the recurrence processing by which a sum set of a proper subset of the "fourth subset" and a subset of a complementary set of the "fourth subset" (a set obtained by removing the "fourth subset" from the "universal set") is set as a new "fourth subset" and consistency verification of the query or the secret share value of the query is performed among the new "fourth subset". This also makes it possible to identify the above-described "first set" and/or "second set" efficiently. In particular, when the consistency verification among the "third subset" was failed but the consistency verification among the new "third subset" was successful, it is clear that "data" of a secure computation device which is contained in the "third subset" before update but is not contained in the new "third subset" has been falsified. Thus, another consistency verification is performed among a set from which this secure computation device is removed, and, if this consistency verification is successful, the set may be used as the "first set" and/or the "second set". This makes it possible to increase the number of members of the "first set" and/or the "second set" and increase the number of secure computation devices belonging to the "intersection".

Each of the secure computation devices may collectively perform consistency verification of the secret share value of the object data and consistency verification of the query or the secret share values of the query. For example, consistency verification may be performed on information including the secret share value of the object data and the query or the secret share value of the query. This makes it possible to perform the consistency verification efficiently. In this case, the consistency verification of information obtained by disturbing information including the secret share value of object data and the query or secret share value of the query may be performed. This makes it possible to prevent leakage of at least one of the object data and the query in the course of consistency verification.

The consistency verification scheme is not limited to a particular scheme. For instance, a scheme disclosed in Non-patent Literature 1 may be used or any other scheme may be used. For example, the secure computation device may perform the consistency verification by obtaining a combined value s of a plurality of arbitrary values obtained in a subset (the universal set or the proper subset thereof) of the "universal set", obtaining a linear combination value $[c]_i$ of values including at least one of the secret share value of the object data and the query or secret share value of the query by using the function values of the combined value s as coefficients, and distributing a secret share value $[d]_i$ corresponding to the linear combination value $[c]_i$ to another secure computation device. As a result, since the consistency verification of a plurality of pieces of data can be collectively executed, it is possible to make processing efficient. In so doing, the secure computation device may obtain a random number secret share value $[R]_i$ and obtain the secret share value $[d]_i$ by disturbing the linear combination value $[c]_i$ with the random number secret share value $[R]_i$. This makes it possible to prevent leakage of at least one of the object data and the query in the course of the consistency verification.

Hereinafter, each embodiment will be described with reference to the drawings.

First Embodiment

A first embodiment will be described.
<Configuration>
As illustrated in FIG. 1, a secure computation system 1 of the present embodiment includes a registering device 11, N secure computation devices 12-0, ..., 12-(N−1), and an analyzing device 13. Here, N is an integer greater than or equal to 2 and, for example, an integer greater than or equal to 3. The registering device 11 and the secure computation devices 12-0, ..., 12-(N−1) are configured so as to be capable of communicating with each other via a network which is not secure, such as the Internet. Likewise, the secure computation devices 12-0, ..., 12-(N−1) and the analyzing device 13 are configured so as to be capable of communicating with each other via a network which is not secure. Incidentally, for the purpose of illustration, an example in which one registering device 11 and one analyzing device 13 are present is described, but the number of at least one of these devices may be more than one.

Figure 2A:
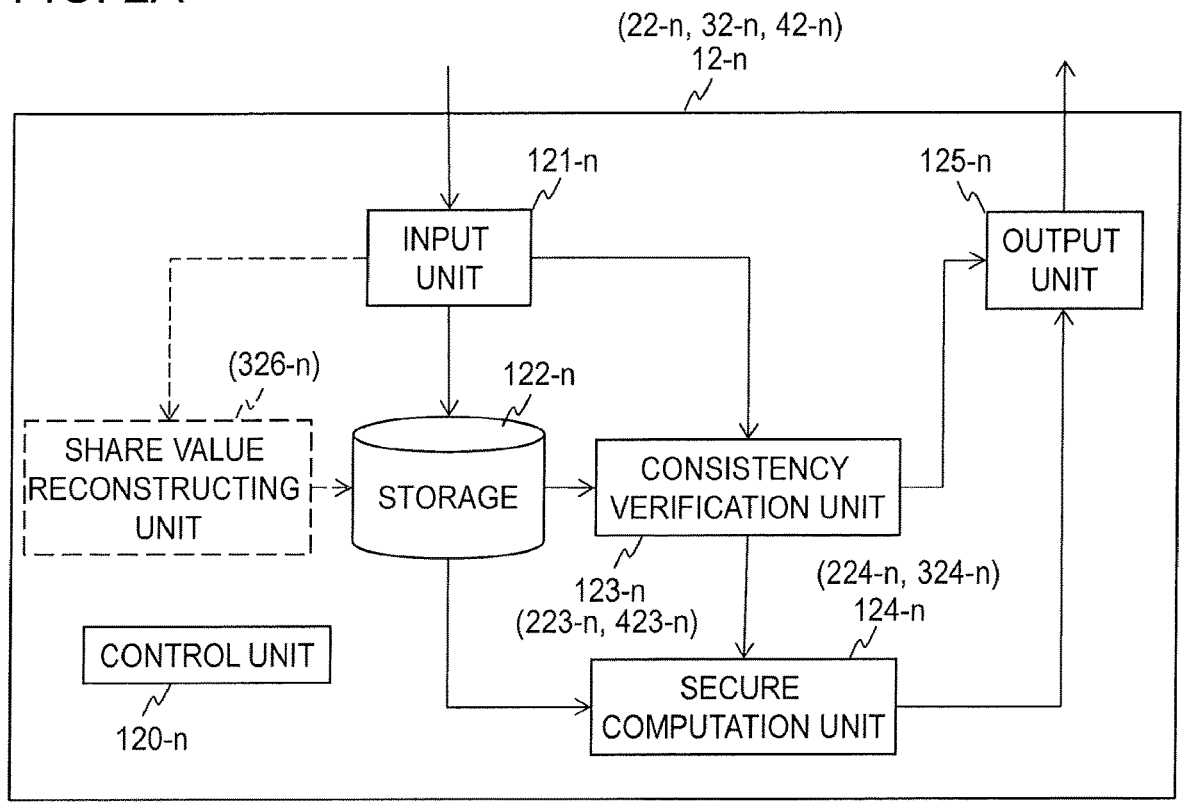
FIG. 2A is a block diagram illustrating the functional configuration of a secure computation device of the embodiment.
Figure 2B:
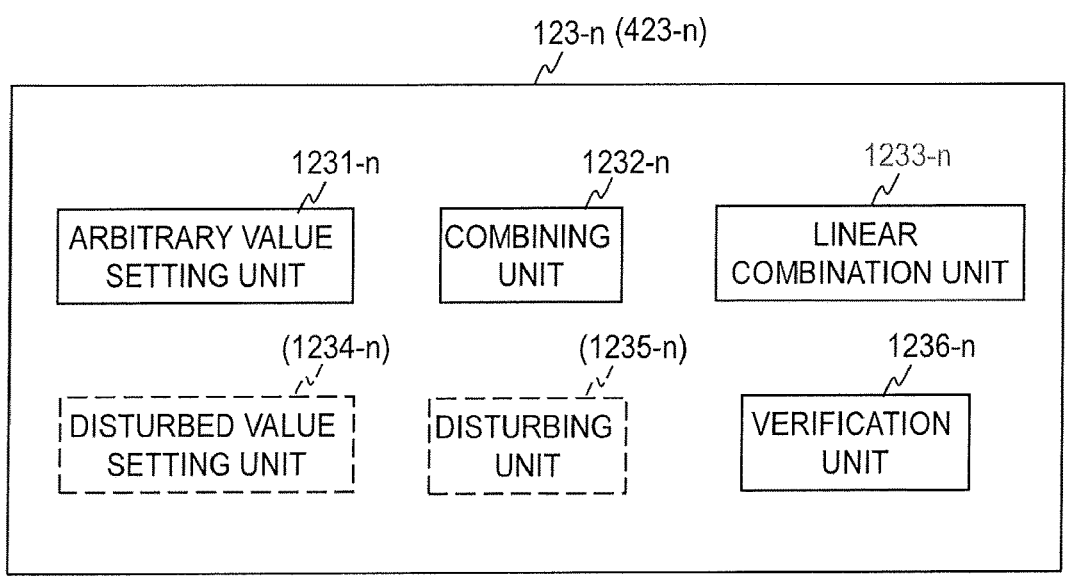
FIG. 2B is a block diagram illustrating the functional configuration of a consistency verification unit of the embodiment.
Figure 3:
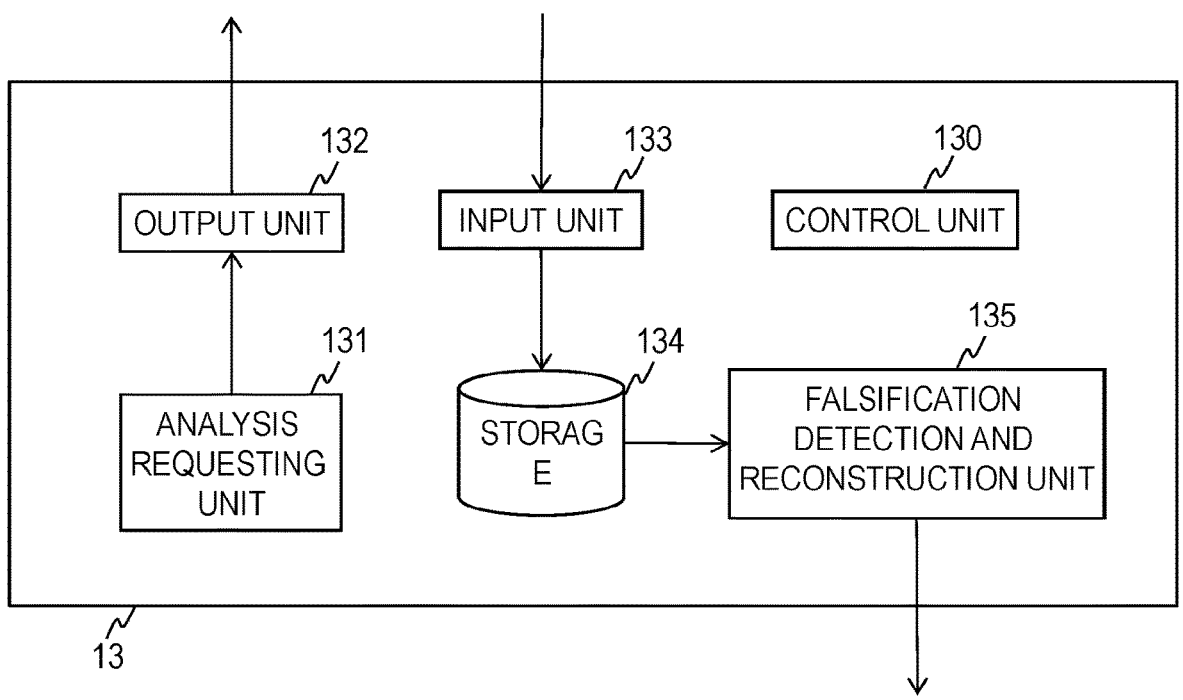
FIG. 3 is a block diagram illustrating the functional configuration of an analyzing device of the embodiment.

As illustrated in FIG. 2A, a secure computation device 12-n (n=0, ..., (N−1)) of the present embodiment includes, for example, a control unit 120-n, an input unit 121-n, a storage 122-n, a consistency verification unit 123-n, a secure computation unit 124-n, and an output unit 125-n. As illustrated in FIG. 2B, the consistency verification unit 123-n includes, for example, an arbitrary value setting unit 1231-n, a combining unit 1232-n, a linear combination unit 1233-n, and a verification unit 1236-n. The consistency verification unit 123-n may further include a disturbed value setting unit 1234-n and a disturbing unit 1235-n. The secure computation device 12-n executes each processing under control of the control unit 120-n. Data obtained in each unit of the secure computation device 12-n is stored in unillustrated temporary memory and used for each processing by being read when necessary. As illustrated in FIG. 3, the analyzing device 13 includes a control unit 130, an analysis requesting unit 131, an output unit 132, an input unit 133, a storage 134, and a falsification detection and reconstruction unit 135. Each device is configured as a result of, for example, a general-purpose or dedicated computer including a processor (a hardware processor) such as a central processing unit (CPU), a memory such as a random-access memory (RAM) and a read-only memory (ROM), and so forth executing a predetermined program. This computer may include one processor or memory or more than one processor or memory. This program may be installed in the computer or may be recorded on the ROM or the like in advance. Moreover, part or all of the processing units may be configured by using not an electronic circuit (circuitry), like a CPU, which implements a functional configuration as a result of a program being read thereinto but an electronic circuit that implements a processing function without using a program. An electronic circuit with which one device is configured may include a plurality of CPUs.

Figure 4:
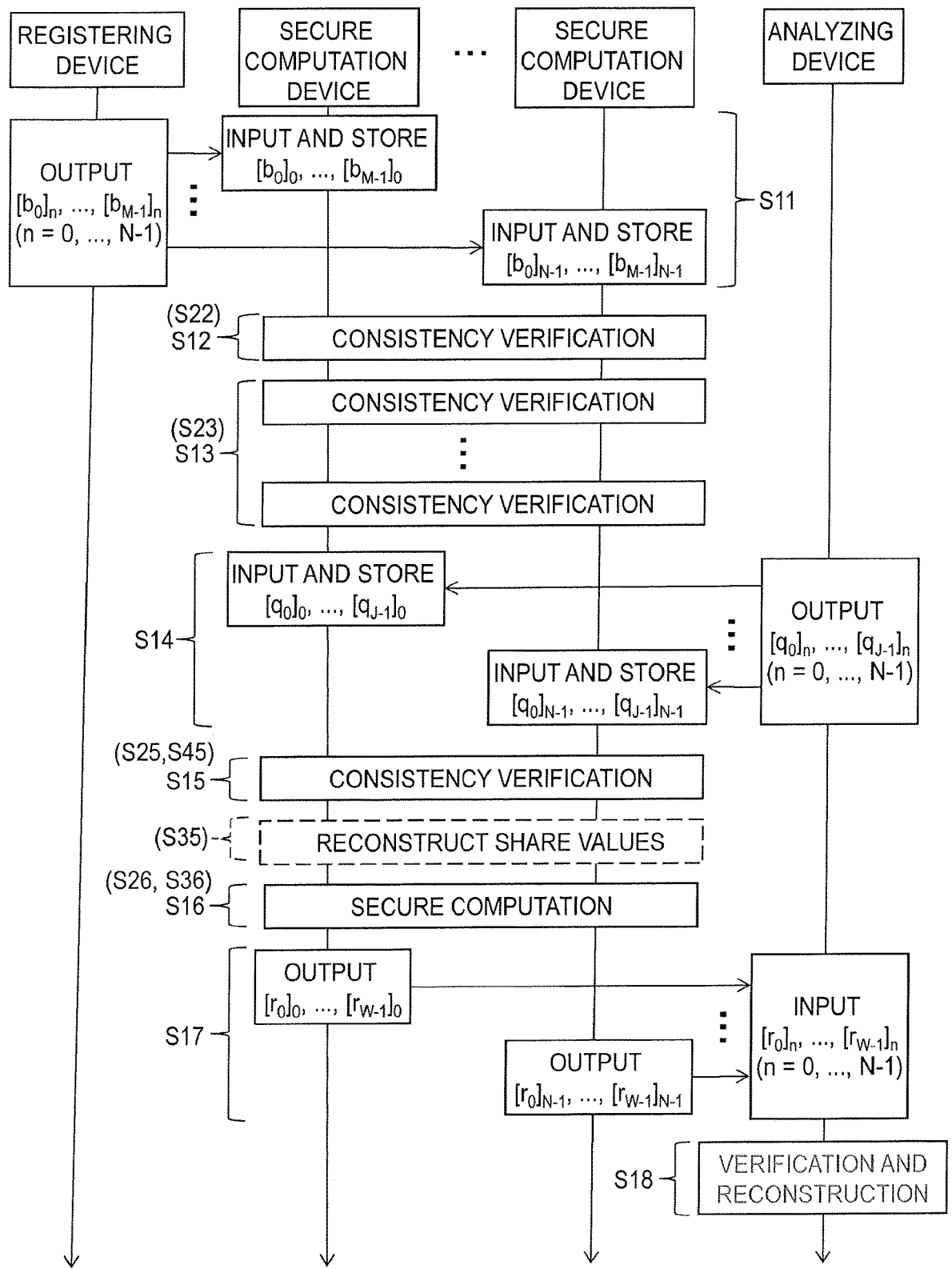
FIG. 4 is a sequence diagram illustrating processing of the embodiment.

<Processing>
Processing of the present embodiment includes "registration processing", "storage processing", and "analysis processing". Hereinafter, the processing of the present embodiment will be described by using FIG. 4.

"Registration Processing"
In the registration processing, the registering device 11 generates secret share values $[b_0]_0, \ldots, [b_0]_{N-1}, \ldots, [b_{M-1}]_0, \ldots, [b_{M-1}]_{N-1}$, each being N secret share values, by performing secret sharing on each of object data $b_0, \ldots, b_{M-1}$ on which secure computation is to be performed. Here, M is an integer greater than or equal to 1 (for example, M is an integer greater than or equal to 2) and N secret share values of the object data $b_m$ (m=0, ..., M−1) are written as $[b_m]_0, \ldots, [b_m]_{N-1}$. Secret sharing of the present embodiment is performed in conformance with a (K, N) threshold secret sharing scheme. In the (K, N) threshold secret sharing scheme, original data (plaintext) can be completely reconstructed if K or more secret share values are collected, but information on the original data cannot be obtained from K−1 or less secret share values. A specific example of the (K, N) threshold secret sharing scheme is Shamir's secret sharing scheme (see, for example, Reference Literature 1 "A. Shamir, "How to Share a Secret", Communications of the ACM, November 1979, Volume 22, Number 11, pp. 612-613.") or a modified scheme thereof. Secret share values $[b_0]_n, \ldots, [b_{M-1}]_n$ (n=0, ..., N−1) of the object data are sent to each of the secure computation devices 12-n. The secret share values $[b_0]_n, \ldots, [b_{M-1}]_n$ of the object data are input to the input unit 121-n of the secure computation device 12-n (FIG. 2A) and stored in the storage 122-n (Step S11).

When the secret share values $[b_0]_n, \ldots, [b_{M-1}]_n$ of the object data are stored in the storage 122-n, the consistency verification units 123-n of the N secure computation devices 12-n (n=0, ..., N−1) communicate with each other and perform consistency verification of the secret share values $[b_0]_n, \ldots, [b_{M-1}]_n$ of the object data. The consistency verification may be performed in accordance with Non-patent Literature 1 or any other publicly known scheme or may be performed in accordance with a scheme which will be described later. As a result, falsification of the secret share values $[b_0]_n, \ldots, [b_{M-1}]_n$ of the object data made in the registering device 11 or between the registering device 11 and the secure computation device 12-$n$ is detected. When this consistency verification was successful, $[b_0]_n, \ldots, [b_{M-1}]_n$ are held in the storage 122-$n$. On the other hand, if this consistency verification failed, $[b_0]_n, \ldots, [b_{M-1}]_n$ are deleted from the storage 122-$n$, and the processing is returned to Step S11 or terminated with an error message (Step S12).

"Storage Processing"

In the storage processing, each secure computation device 12-$n$ holds the secret share values $[b_0]_n, \ldots, [b_{M-1}]_n$ of the object data in the storage 122-$n$. Meanwhile, the consistency verification units 123-$n$ of the N secure computation devices 12-$n$ (n=0, . . . , N−1) may communicate with each other on a regular basis or by being triggered by a predetermined cause and perform consistency verification of the secret share values $[b_0]_n, \ldots, [b_{M-1}]_n$ of the object data. As a result, falsification of the secret share values $[b_0]_n, \ldots, [b_{M-1}]_n$ of the object data made in the secure computation device 12-$n$ is detected. If this consistency verification was successful, $[b_0]_n, \ldots, [b_{M-1}]_n$ are held in the storage 122-$n$. On the other hand, if this consistency verification failed, $[b_0]_n, \ldots, [b_{M-1}]_n$ are deleted from the storage 122-$n$, and the processing is returned to Step S11 or terminated with an error message (Step S13).

"Analysis Processing"

In the analysis processing, first, the analysis requesting unit 131 of the analyzing device 13 generates a query which requests secure computation or secret share values of the query and outputs the query or the secret share values of the query. The query may describe the details of calculation which requests secure computation or describe data on which calculation is to be performed. In the present embodiment, the query or the secret share values of the query which the analysis requesting unit 131 outputs are expressed as $[q_0]_n, \ldots, [q_{J-1}]_n$ (n=0, . . . , N−1). Here, J is an integer greater than or equal to 1. If $[q_j]_n$ (j=0, . . . , J−1) is the query itself (original data), $[q_j]_0 = \ldots = [q_j]_{N-1}$ holds. If $[q_j]_n$ (j=0, . . . , J−1) is a secret share value of the query, $[q_j]_0, \ldots, [q_j]_{N-1}$ are N secret share values of a query $q_j$. The output unit 132 outputs the query or the secret share values $[q_0]_n, \ldots, [q_{J-1}]_n$ (n=0, . . . , N−1) of the query, and they are sent to each of the secure computation devices 12-$n$. $[q_0]_n, \ldots, [q_{J-1}]_n$ are input to the input unit 121-$n$ of the secure computation device 12-$n$ (FIG. 2A) and stored in the storage 122-$n$ (Step S14).

When the query or the secret share values $[q_0]_n, \ldots, [q_{J-1}]_n$ of the query are stored in the storage 122-$n$, the consistency verification units 123-$n$ of the N secure computation devices 12-$n$ (n=0, . . . , N−1) communicate with each other and perform consistency verification of the query or the secret share values $[q_0]_n, \ldots, [q_{J-1}]_n$ of the query. Here, even when $[q_j]_n$ is the query itself, it is possible to perform the consistency verification by regarding $[q_j]_n$ as a secret share value. As a result, falsification of $[q_0]_n, \ldots, [q_{J-1}]_n$ made in the analyzing device 13 or between the analyzing device 13 and the secure computation device 12-$n$ is detected. If this consistency verification was successful, $[q_0]_n, \ldots, [q_{J-1}]_n$ are held in the storage 122-$n$. On the other hand, if this consistency verification failed, $[q_0]_n, \ldots, [q_{J-1}]_n$ are deleted from the storage 122-$n$, and the processing is returned to Step S14 or terminated with an error message (Step S15).

If the consistency verification of $[q_0]_n, \ldots, [q_{J-1}]_n$ was successful, each secure computation unit 124-$n$ of the secure computation devices 12-$n$ reads, from the storage 122-$n$, $[b_0]_n, \ldots, [b_{M-1}]_n$ which passed the consistency verification and $[q_0]_n, \ldots, [q_{J-1}]_n$ which passed the consistency verification. The secure computation unit 124-$n$ obtains secret share values $[r_0]_n, \ldots, [r_{W-1}]_n$ of the calculation results by performing secure computation in accordance with $[q_0]_n, \ldots, [q_{J-1}]_n$ which passed the consistency verification by using $[b_0]_n, \ldots, [b_{M-1}]_n$ which passed the consistency verification. Here, W is an integer greater than or equal to 1 (for example, W is an integer greater than or equal to 2). In the present embodiment, the secure computation unit 124-$n$ obtains the secret share values $[r_0]_n, \ldots, [r_{W-1}]_n$ of the calculation results by performing secure computation by secure computation with falsification detection (see, for example, Reference Literature 2 "Dai Ikarashi, Koji Chida, Koki Hamada, Ryo Kikuchi, "An Extremely Efficient Secret-sharing-based Multi-Party Computation against Malicious Adversary", In SCIS 2013, 2013."). Falsification made in K−1 or less secure computation devices 12-$n$ in the course of this calculation can be detected here. If falsification is detected, this secure computation is performed again or the processing is terminated with an error message. If falsification is not detected, the secret share values $[r_0]_n, \ldots, [r_{W-1}]_n$ of the calculation results are sent to the output unit 125-$n$ (Step S16). The output unit 125-$n$ (n=0, . . . , N−1) outputs the secret share values $[r_0]_n, \ldots, [r_{W-1}]_n$ of the calculation results, and they are sent to the analyzing device 13 (Step S17).

The secret share values $[r_0]_n, \ldots, [r_{W-1}]_n$ of the calculation results are input to the input unit 133 of the analyzing device 13 (FIG. 3) and stored in the storage 134. The secret share values $[r_0]_n, \ldots, [r_{W-1}]_n$ (n=0, . . . , N−1) of the calculation results are sent to the falsification detection and reconstruction unit 135. The falsification detection and reconstruction unit 135 performs detection of falsification and reconstruction of them (see, for example, Reference Literature 2) and reconstructs and outputs calculation results $r_0, \ldots, r_{W-1}$. Falsification made in the secure computation device 12-$n$ or between the secure computation device 12-$n$ and the analyzing device 13 is detected here. If falsification is detected, the processing in and after Step S16 is performed again or the processing is terminated with an error message. If falsification is not detected, the calculation results $r_0, \ldots, r_{W-1}$ are output (Step S18).

<Specific Example of Consistency Verification>

Figure 5:
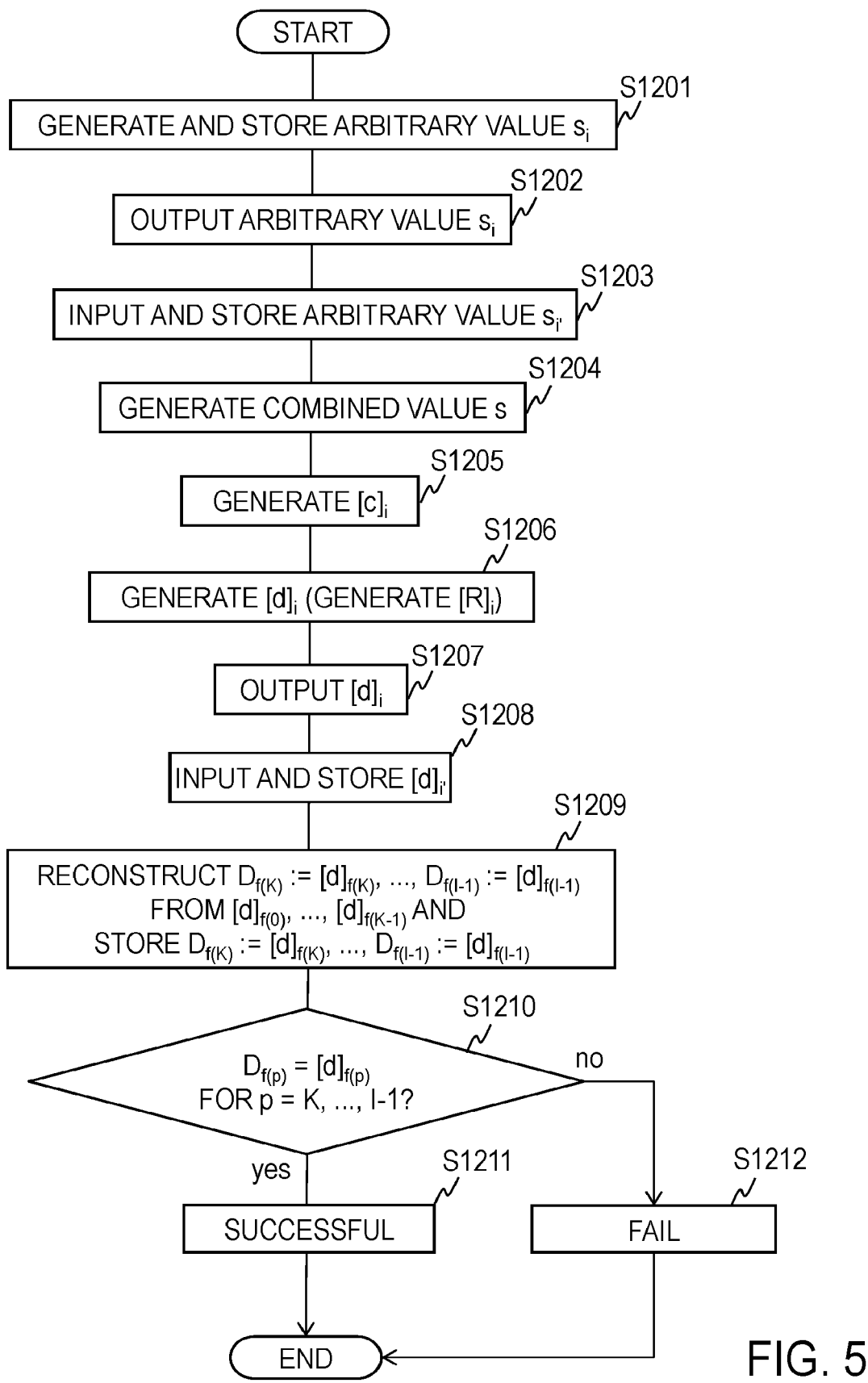
FIG. 5 is a flow diagram illustrating consistency verification processing of the embodiment.

A specific example of consistency verification is described by using FIG. 5. Hereinafter, descriptions will be given by generalizing the specific example to a case in which I secure computation devices 12-0 to 12-(I−1) perform consistency verification of $[a_0]_i, \ldots, [a_{Y-1}]_i$ (i=0, . . . , I−1) in cooperation with each other. Here, Y is an integer greater than or equal to 1, and I is an integer greater than K and less than or equal to N (N≥I>K; for example, N≥I≥2) and satisfies {0, . . . , I−1}⊆{0, . . . , N−1}. Examples of $[a_0]_i, \ldots, [a_{Y-1}]_i$ are the secret share values $[b_0]_i, \ldots, [b_{M-1}]_i$ (in this case, Y=M) of the object data, and the query or the secret share values $[q_0]_i, \ldots, [q_{J-1}]_i$ (in this case, Y=J) of the query.

First, each of arbitrary value setting units 1231-$i$ of consistency verification units 123-$i$ of secure computation devices 12-$i$ (FIG. 2B) selects an arbitrary value $s_i$. An example of the arbitrary value $s_i$ is a pseudo random number, a random number, or a constant. The arbitrary value $s_i$ is stored in a storage 122-$i$ and sent to an output unit 125-$i$ (Step S1201). The arbitrary value $s_i$ is output from the output unit 125-$i$ and distributed to another secure computation device 12-$i'$ ($i' \in \{0, \ldots, I-1\}$ and $i' \neq i$) (Step S1202). The arbitrary values $s_{i'}$ distributed from the other secure computation devices 12-$i'$ are input to an input unit 121-$i$ and stored in the storage 122-$i$ (Step S1203). A combining unit 1232-$i$ reads the arbitrary values $s_0, \ldots, s_{I-1}$ from the storage 122-$i$ and obtains a combined value $s := g(s_0, \ldots, s_{I-1})$ of the arbitrary values $s_0, \ldots, s_{I-1}$. Here, "$\alpha := \beta$" means that $\alpha$ is defined as $\beta$. $g(\bullet)$ represents the function value of $(\bullet)$. Any $g(\bullet)$ may be used as long as the combined value $s$ is uniquely defined for the arbitrary values $s_0, \ldots, s_{I-1}$. For instance, linear combination of the arbitrary values $s_0, \ldots, s_{I-1}$, such as $s := s_0 + \ldots + s_{I-1}$, may be used as the combined value $s$, or the product of the arbitrary values $s_0, \ldots, s_{I-1}$, such as $s := s_0 \times \ldots \times s_{I-1}$, may be used as the combined value $s$. The combined value $s$ is stored in the storage 122-$i$ (Step S1204).

A linear combination unit 1233-$i$ reads the combined value $s$ and $[a_0]_i, \ldots, [a_{Y-1}]_i$ from the storage 122-$i$ and obtains a linear combination value $[c]_i := z_0[a_0]_i + \ldots + z_{Y-1}[a_{Y-1}]_i$ of $[a_0]_i, \ldots, [a_{Y-1}]_i$ ($i=0, \ldots, I-1$) by using the function values of the combined value $s$ as coefficients $z_y$ ($y=0, \ldots, Y-1$). Each of the coefficients $z_y$ may be a value $z_y := h(s, y)$ which is determined by the combined value $s$ and $y$ or may be a value $z_y := h(s)$ which is determined only for the combined value $s$. Here, $h(\bullet)$ represents the function value of $(\bullet)$. For instance, $z_y$ may be any one of $z_y := s^{y+1}$, $z_y := s^{2y+1}$, and $z_y := s$. The linear combination value $[c]_i$ is stored in the storage 122-$i$ (Step S1205).

Each of verification units 1236-$i$ outputs a secret share value $[d]_i$ corresponding to the linear combination value $[c]_i$ read from the storage 122-$i$. For example, the linear combination value $[c]_i$ may be used as the secret share value $[d]_i$ as it is or the function value of $[c]_i$ may be used as the secret share value $[d]_i$. When each of the consistency verification units 123-$i$ includes a disturbed value setting unit 1234-$i$ and a disturbing unit 1235-$i$, the disturbed value setting unit 1234-$i$ may obtain a random number secret share value $[R]_i$ and the disturbing unit 1235-$i$ may obtain the secret share value $[d]_i$ obtained by disturbing the linear combination value $[c]_i$ with the random number secret share value $[R]_i$ by using the input random number secret share value $[R]_i$ and the linear combination value $[c]_i$. For example, the disturbed value setting unit 1234-$i$ may obtain $[d]_i := [c-R]_i$ by secure computation by using the generated pseudo random number or random number as the random number secret share value $[R]_i$. Here, $[c-R]_i$ is a secret share value of $c-R$ in conformance with the (K, N) threshold secret sharing scheme. The secret share value $[d]_i$ is stored in the storage 122-$i$ and sent to the output unit 125-$i$ (Step S1206).

The secret share value $[d]_i$ is output from the output unit 125-$i$ and distributed to another secure computation device 12-$i'$ ($i' \in \{0, \ldots, I-1\}$ and $i' \neq i$) (Step S1207). Secret share values $[d]_{i'}$ distributed from the other secure computation device 12-$i'$ is input to the input unit 121-$i$ and stored in the storage 122-$i$ (Step S1208).

The verification unit 1236-$i$ reads K secret share values $[d]_{f(0)}, \ldots, [d]_{f(K-1)}$ from the storage 122-$i$, reconstructs other I-K secret share values $D_{f(K)} := [d]_{f(K)}, \ldots, D_{f(I-1)} := [d]_{f(I-1)}$ by Lagrange's interpolation, and stores the other I-K secret share values $D_{f(K)} := [d]_{f(K)}, \ldots, D_{f(I-1)} := [d]_{f(I-1)}$ in the storage 122-$i$. It is to be noted that $\{f(0), \ldots, f(I-1)\} = \{0, \ldots, I-1\}$ is satisfied and, for example, $f(i) = i$ holds (Step S1209).

The verification unit 1236-$i$ reads, from the storage 122-$i$, $[d]_{f(K)}, \ldots, [d]_{f(N-1)}$ input in Step S1208 and $D_{f(K)}, \ldots, D_{f(N-1)}$ reconstructed in Step S1209 and makes a comparison therebetween (Step S1210). Here, if $D_{f(p)} = [d]_{f(p)}$ holds for all of $p = K, \ldots, I-1$, the verification unit 1236-$i$ outputs a result representing the consistency verification of $[a_0]_i, \ldots, [a_{Y-1}]_i$ being successful (Step S1211). On the other hand, if $D_{f(p)} \neq [d]_{f(p)}$ for any p, the verification unit 1236-$i$ outputs a result representing the consistency verification of $[a_0]_i, \ldots, [a_{Y-1}]_i$ failing (Step S1212).

In this specific example of consistency verification, high efficiency is achieved because consistency verification of $[a_0]_i, \ldots, [a_{Y-1}]_i$ can be collectively executed. Moreover, when the secret share value $[d]_i$ which is obtained by disturbing the linear combination value $[c]_i$ with the random number secret share value $[R]_i$ is used, it is possible to prevent information of reconstructed values of $[a_0]_i, \ldots, [a_{Y-1}]_i$ from leaking in Step S1209.

Second Embodiment

In a second embodiment, the secure computation devices belonging to the "intersection" of the above-described "first set" and the above-described "second set" outputs secret share values of the calculation results. At least one of the "first set" and the "second set" may be a proper subset of a "universal set" whose members are the plurality of secure computation devices. Hereinafter, a difference from the already-explained matter will be mainly described, and descriptions of the already-explained matter will be simplified by using the same reference characters as those used for the already-explained matter.

<Configuration>

As illustrated in FIG. 1, a secure computation system 2 of the present embodiment includes the registering device 11, N secure computation devices 22-0, . . . , 22-(N-1), and the analyzing device 13. As illustrated in FIG. 2A, each of the secure computation devices 22-$n$ ($n=0, \ldots, (N-1)$) of the present embodiment includes, for example, a control unit 120-$n$, an input unit 121-$n$, a storage 122-$n$, a consistency verification unit 223-$n$, a secure computation unit 224-$n$, and an output unit 125-$n$.

<Processing>

Processing of the present embodiment also includes "registration processing", "storage processing", and "analysis processing". Hereinafter, the processing of the present embodiment will be described by using FIG. 4.

"Registration Processing"

First, the registering device 11 and the secure computation device 22-$n$ execute the processing in Step S11 described in the first embodiment. Next, as described in Step S12 of the first embodiment, the consistency verification units 223-$n$ of the N secure computation devices 22-$n$ ($n=0, \ldots, N-1$) communicate with each other and perform consistency verification of the secret share values $[b_0]_n, \ldots, [b_{M-1}]_n$ of the object data. However, in the present embodiment, even when this consistency verification failed, $[b_0]_n, \ldots, [b_{M-1}]_n$ are not deleted from the storage 122-$n$. Instead, a proper subset $S_1$ of a set of the N secure computation devices 22-$n$ ($n=0, \ldots, N-1$) is selected, and consistency verification units 223-$v(\eta)$ of $N_{S1}$ ($N_{S1} > K$) secure computation devices 22-$v(\eta)$ ($\eta=0, \ldots, N_{S1}-1$) belonging to the proper subset $S_1$ communicate with each other and perform consistency verification of secret share values $[b_0]_{v(\eta)}, \ldots, [b_{M-1}]_{v(\eta)}$ of the object data. It is to be noted that $\{v(0), \ldots, v(N_{S1}-1)\} = \{0, \ldots, N_{S1}-1\}$ is satisfied and, for example, $v(\eta) = \eta$ holds. A method of the consistency verification in this proper subset $S_1$ is also not limited to a particular method. For instance, the consistency verification may be performed by the method of Non-patent Literature 1 or the consistency verification may be performed by the method of Steps S1201 to S1212 described earlier on the assumption that $I:=N_{S1}$, $i:=v(\eta)$, and $([a_0]_i, \ldots, [a_{Y-1}]_i):=([b_0]_{v(\eta)}, \ldots, [b_{M-1}]v(\eta))$. If the consistency verification which was performed among the $N_{S1}$ secure computation devices $22$-$v(\eta)$ ($\eta=0, \ldots, N_{S1}-1$) belonging to the proper subset $S_1$ failed, another proper subset $S_1$ is selected, and consistency verification among the selected proper subset $S_1$ is executed. The proper subset $S_1$ is selected in accordance with the standards set in advance. A proper subset of the proper subset $S_1$ may be used as a new proper subset $S_1$, a complementary set of the proper subset $S_1$ may be used as a new proper subset $S_1$, or a sum set of a proper subset and a complementary set of the proper subset $S_1$ may be used as a new proper subset $S_1$. A specific example thereof will be described later. If the consistency verification which was performed among a universal set U of the N secure computation devices $22$-$n$ ($n=0, \ldots, N-1$) was successful, information representing this result is stored in the storage $122$-$n$ ($n=0, \ldots, N-1$). If the consistency verification which was performed among the proper subset $S_1$ was successful, information representing this result is stored in the storage $122$-$n$ ($n=0, \ldots, N-1$). If the consistency verification which was performed among the universal set U or the proper subset $S_1$ was successful, the secret share values $[b_0]_n, \ldots, [b_{M-1}]_n$ of the object data are held in the storage $122$-$n$. On the other hand, if the consistency verification failed even after a predetermined number of updates of the proper subset $S_1$, if consistency verification is performed by each of predetermined proper subsets $S_1$ and failed in all the cases, or the number of members of the proper subset $S_1$ in which consistency verification was successful is less than K, $[b_0]_n, \ldots, [b_{M-1}]_n$ are deleted from the storage $122$-$n$, and the processing is returned to Step S11 or terminated with an error message (Step S22).

"Storage Processing"

Also in the storage processing, the same consistency verification as that performed in Step S22 may be performed on a regular basis or by being triggered by a predetermined cause. If the consistency verification which was performed among the universal set U of the N secure computation devices $22$-$n$ ($n=0, \ldots, N-1$) was successful, information representing this result is stored in the storage $122$-$n$ ($n=0, \ldots, N-1$). If the consistency verification in the proper subset $S_1$ was successful, information to that effect is stored in the storage $122$-$n$ ($n=0, \ldots, N-1$). If the consistency verification which was performed among the universal set U or the proper subset $S_1$ was successful, the secret share values $[b_0]_n, \ldots, [b_{M-1}]_n$ of the object data are held in the storage $122$-$n$. On the other hand, if the consistency verification failed even after a predetermined number of updates of the proper subset $S_1$, if consistency verification is performed by each of predetermined proper subsets $S_1$ and failed in all the cases, or the number of members of the proper subset $S_1$ in which consistency verification was successful is less than K, $[b_0]_n, \ldots, [b_{M-1}]_n$ are deleted from the storage $122$-$n$, and the processing is returned to Step S11 or terminated with an error message (Step S23).

"Analysis Processing"

First, the analyzing device 13 and the secure computation devices $22$-$n$ execute the processing in Step S14 described in the first embodiment. Next, as described in Step S15 of the first embodiment, the consistency verification units $223$-$n$ of the N secure computation devices $22$-$n$ ($n=0, \ldots, N-1$) communicate with each other and perform consistency verification of the query or the secret share values $[q_0]_n, \ldots, [q_{J-1}]_n$ of the query. However, in the present embodiment, even when this consistency verification failed, $[q_0]_n, \ldots, [q_{J-1}]_n$ are not deleted from the storage $122$-$n$. Instead, a proper subset $S_2$ of the set of the N secure computation devices $22$-$n$ ($n=0, \ldots, N-1$) is selected, and $N_{S2}$ ($N_{S2}>K$) secure computation devices $22$-$u(\iota)$ ($\iota=0, \ldots, N_{S2}-1$) belonging to the proper subset $S_2$ communicate with each other and perform consistency verification of $[q_0]_{u(\iota)}, \ldots, [q_{J-1}]_{u(\iota)}$. It is to be noted that $\{u(0), \ldots, u(N_{S2}-1)\}=\{0, \ldots, N_{S2}-1\}$ is satisfied and, for example, $u(\iota)=\iota$ holds. A method of consistency verification in this proper subset $S_2$ is also not limited to a particular method. For instance, consistency verification may be performed by the method of Non-patent Literature 1 or consistency verification may be performed by the method of Steps S1201 to S1212 on the assumption that $I=N_{S2}$, $i=u(\iota)$, and $([a_0]_i, \ldots, [a_{Y-1}]_i)=([q_0]_{u(\iota)}, \ldots, [q_{J-1}]_{u(\iota)})$. If the consistency verification which was performed among the $N_{S2}$ secure computation devices $22$-$u(\iota)$ ($i=0, \ldots, N_{S2}-1$) belonging to the proper subset $S_2$, another proper subset $S_2$ is selected, and consistency verification among the selected proper subset $S_2$ is executed. The proper subset $S_2$ is selected in accordance with the standards set in advance. A proper subset of the proper subset $S_2$ may be used as a new proper subset $S_2$, a complementary set of the proper subset $S_2$ may be used as a new proper subset $S_2$, or a sum set of a proper subset and a complementary set of the proper subset $S_2$ may be used as a new proper subset $S_2$. If the consistency verification which was performed among the universal set U of the N secure computation devices $22$-$n$ ($n=0, \ldots, N-1$) was successful, information representing this result is stored in the storage $122$-$n$ ($n=0, \ldots, N-1$). If the consistency verification which was performed among the proper subset $S_2$ was successful, information representing this result is stored in the storage $122$-$n$ ($n=0, \ldots, N-1$). If the consistency verification which was performed among the universal set U or the proper subset $S_2$ was successful, the query or the secret share values $[q_0]_n, \ldots, [q_{J-1}]_n$ of the query are held in the storage $122$-$n$. On the other hand, if the consistency verification failed even after a predetermined number of updates of the proper subset $S_2$, if consistency verification is performed by each of predetermined proper subsets $S_2$ and failed in all the cases, or the number of members of the proper subset $S_2$ in which consistency verification was successful is less than K, $[q_0]_n, \ldots, [q_{J-1}]_n$ are deleted from the storage $122$-$n$, and the processing is returned to Step S14 or terminated with an error message (Step S25).

Figure 7A:
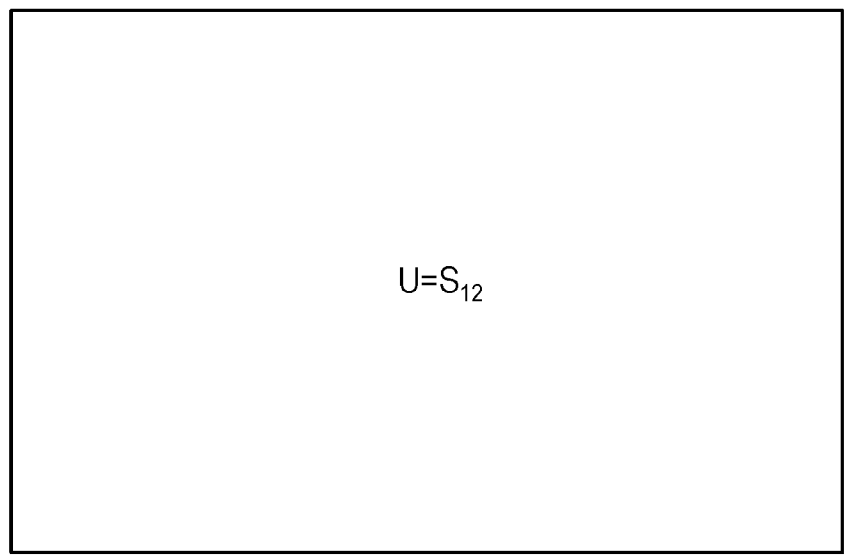
FIGS. 7A and 7B are conceptual diagrams for illustrating processing of the embodiment.
Figure 7B:
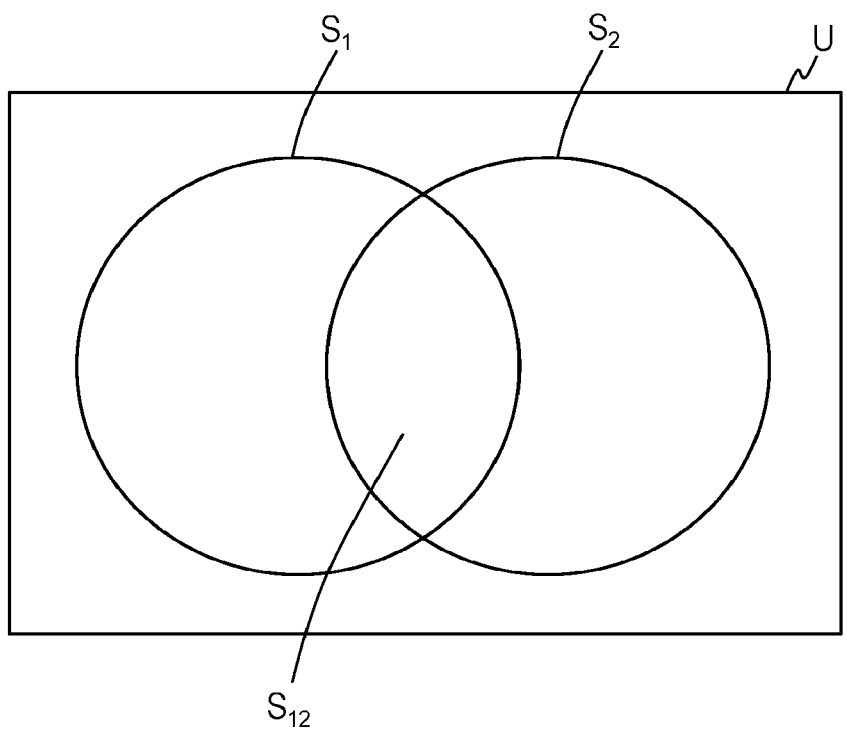

If the consistency verification which was performed among the universal set U or the proper subset $S_2$ was successful, each of secure computation devices $22$-$\kappa$ ($\kappa\in\{0, \ldots, N-1\}$) belonging to an "intersection ($S_{12}$)" of a "first set (U or $S_1$)" and a "second set (U or $S_2$)" performs secure computation. The members of the "first set (U or $S_1$)" are secure computation devices storing the secret share values $[b_0]_n, \ldots, [b_{M-1}]_n$ of the object data, the secret share values $[b_0]_n, \ldots, [b_{M-1}]_n$ having passed the consistency verification performed in Steps S22 and S23, among the N secure computation devices $22$-$0, \ldots, 22$-$(N-1)$. The members of the "second set (U or $S_2$)" are secure computation devices to which the query or the secret share values $[q_0]_n, \ldots, [q_{J-1}]_n$ of the query were input, the query or the secret share values $[q_0]_n, \ldots, [q_{J-1}]_n$ having passed the consistency verification performed in Step S25, among the N secure computation devices $22$-$0, \ldots, 22$-$(N-1)$. For instance, if the consistency verification which was performed among the universal set U in Steps S22, S23, and S25 was successful, U=$S_{12}$ holds and the N secure computation devices 22-0, . . . , 22-(N−1) perform the same processing as that performed in Step S16 described in the first embodiment (FIGS. 7A and 7B). For example, if the consistency verification which was performed among the proper subset $S_1$ in Steps S22 and S23 was successful, and the consistency verification which was performed among the proper subset $S_2$ in Step S25 was successful, the secure computation unit 224-κ of each of the secure computation devices 22-κ (κ∈{0, . . . , N−1}) belonging to the "intersection ($S_{12}$)" of the proper subset $S_1$ and the proper subset $S_2$ obtains secret share values $[r_0]_κ$, . . . , $[r_{W-1}]_κ$ of the calculation results by performing secure computation in accordance with $[q_0]_κ$, . . . , $[q_{J-1}]_κ$ which passed the consistency verification, by using $[b_0]_κ$, . . . , $[b_{M-1}]_κ$ which passed the consistency verification. Also in the present embodiment, secure computation with falsification detection (for example, Reference Literature 2) is used (Step S26). Then, the analyzing device 13 and the secure computation device 22-n execute the same processing as that performed in Steps S17 and S18 described in the first embodiment. However, the processing in Steps S26, S17, and S18 may be performed only when the number of members of the "intersection ($S_{12}$)" is greater than or equal to K which is the required number of secret share values for reconstruction of the calculation results; otherwise, the processing may be terminated with an error message.

<Examples of Update of a Proper Subset on which Consistency Verification is to be Performed>

An example of update of a proper subset on which consistency verification is to be performed, which has been described in Steps S22, S23, and S25, will be described. In Update example 1, when the secret share values $[b_0]_{v(η)}$, . . . , $[b_{M-1}]_{v(η)}$ of the object data did not pass the consistency verification performed among the "first subset (U or $S_1$)" of a "universal set (U)", recurrence processing by which consistency verification of the secret share values $[b_0]_{v(η)}$, . . . , $[b_{M-1}]_{v(η)}$ of the object data is performed by using a proper subset of the "first subset (U or $S_1$)" as a new "first subset ($S_1$)" is performed. Moreover, when the query or the secret share values $[q_0]_{u(ι)}$, . . . , $[q_{J-1}]_{u(ι)}$ of the query did not pass the consistency verification performed among the "second subset (U or $S_2$)" of the "universal set (U)", recurrence processing by which consistency verification of the query or the secret share values of the query is performed by using a proper subset of the "second subset (U or $S_2$)" as a new "second subset ($S_2$)" is performed. In Update example 2, when the secret share values $[b_0]_{v(η)}$, . . . , $[b_{M-1}]_{v(η)}$ of the object data did not pass the consistency verification performed among the "third subset (U or $S_1$)" of the "universal set (U)", recurrence processing by which consistency verification of the secret share values $[b_0]_{v(η)}$, . . . , $[b_{M-1}]_{v(η)}$ of the object data is performed by using a sum set of a proper subset of the "third subset (U or $S_1$)" and a subset of a complementary set of the "third subset (U or $S_1$)" as a new "third subset $S_1$" is performed. When the query or the secret share values $[q_0]_{u(ι)}$, . . . , $[q_{J-1}]_{u(ι)}$ of the query did not pass the consistency verification performed among the a "fourth subset (U or $S_2$)" of the "universal set (U)", recurrence processing by which consistency verification of the query or the secret share values $[q_0]_{u(ι)}$, . . . , $[q_{J-1}]_{u(ι)}$ of the query is performed by using a sum set of a proper subset of the "fourth subset (U or $S_2$)" and a subset of a complementary set of the "fourth subset (U or $S_2$)" as a new "fourth subset $S_2$" is performed. Hereinafter, descriptions will be given by generalizing $S_1$ and $S_2$ to a subset S.

Update Example 1

Figure 6A:
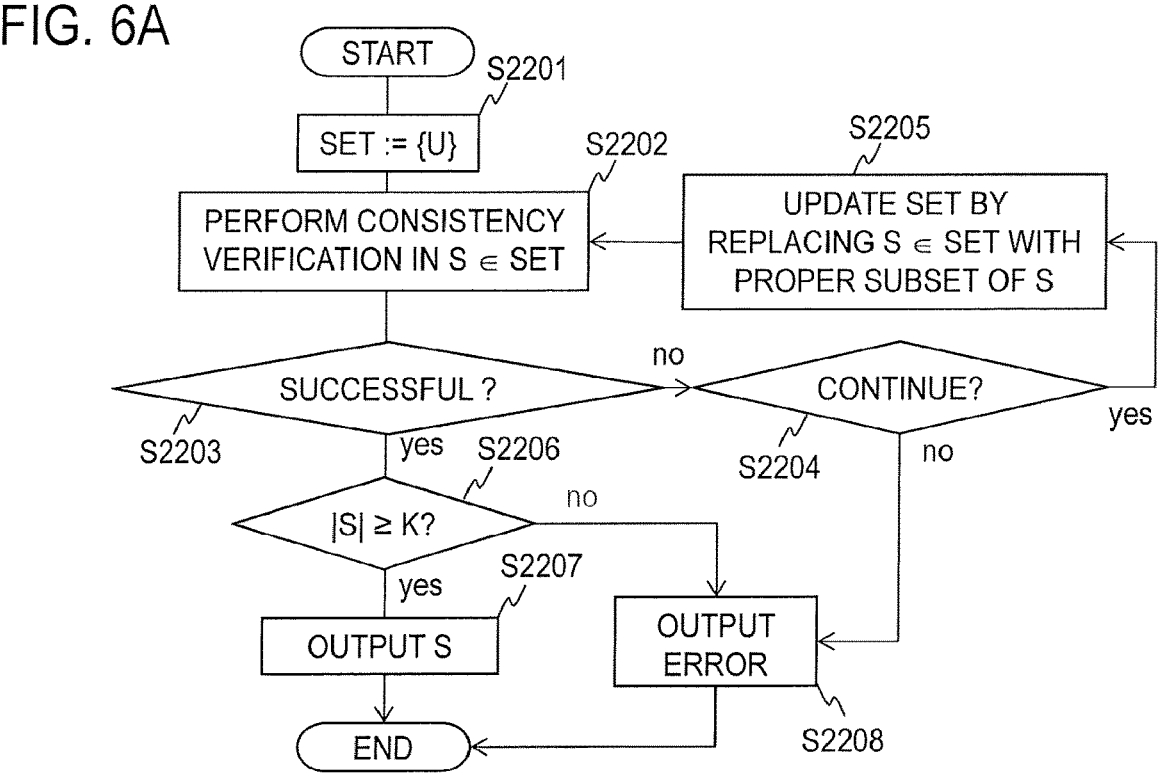
FIGS. 6A and 6B are flow diagrams illustrating processing of the embodiment.
Figure 8A:
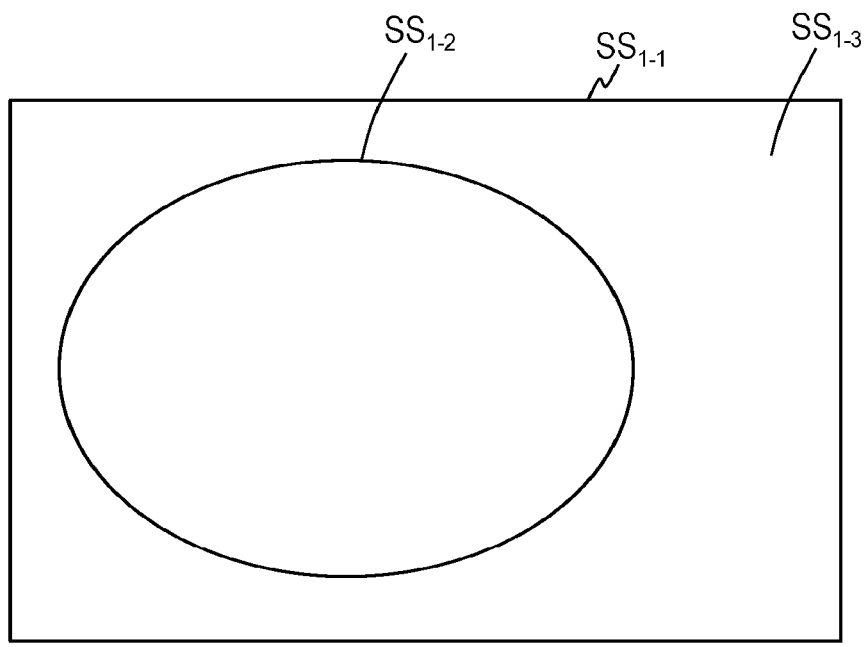
FIGS. 8A and 8B are conceptual diagrams for illustrating processing of the embodiment.
Figure 8B:
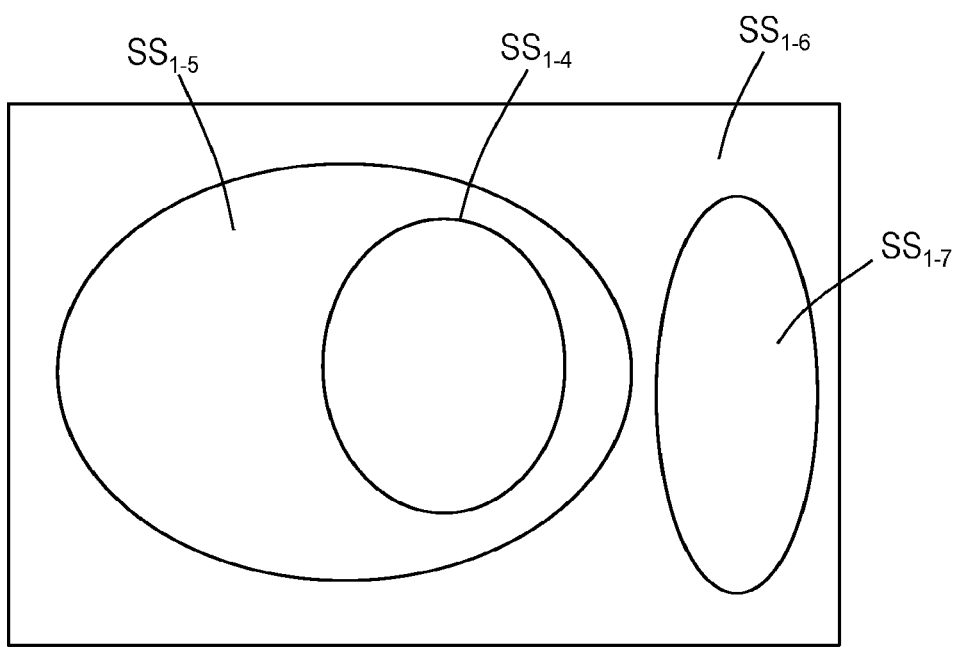

As illustrated in FIG. 6A, in Update example 1, the consistency verification units 223-n of the N secure computation devices 22-n (n=0, . . . , N−1) first set a universal set U of the N secure computation devices 22-n as an element of a system of sets SET (SET:={U}) (Step S2201). Consistency verification units 223-e(v) of $N_S$ ($N_S$>K) secure computation devices 22-e(v) (v=0, . . . , $N_S$−1) belonging to a subset S∈SET (an initial subset is the universal set U) which is an element of the system of sets SET communicate with each other and perform consistency verification of data (the secret share values of the object data or the query or the secret share values of the query). It is to be noted that {e(0), . . . , e($N_S$−1)}={0, . . . , $N_S$−1} is satisfied and, for example, e(v)=v holds (Step S2202). Here, if there is no subset S in which the consistency verification is successful (Step S2203), the consistency verification unit 223-e(v) determines whether a continuance condition for consistency verification is met (Step S2204). Examples of the continuance condition are "the number of updates of the subset S is smaller than or equal to a predetermined number", "consistency verification of a predetermined subset is not finished", and so forth. Here, if the continuance condition for consistency verification is not met, the consistency verification unit 223-e(v) terminates the processing with an error message (Step S2208). On the other hand, if the continuance condition for consistency verification is met, the consistency verification unit 223-e(v) updates the system of sets SET by replacing the subset S with a proper subset thereof. For example, in an example of FIG. 8A, when SET:={$SS_{1-1}$}, the subset S=$SS_{1-1}$ is replaced with proper subsets $SS_{1-2}$ and $SS_{1-3}$ thereof and update to SET:={$SS_{1-2}$, $SS_{1-3}$} is performed. In an example of FIG. 8B, when SET:={$SS_{1-2}$, $SS_{1-3}$}, $SS_{1-2}$ is replaced with proper subsets $SS_{1-4}$ and $SS_{1-5}$ thereof and $SS_{1-3}$ is replaced with proper subsets $SS_{1-6}$ and $SS_{1-7}$ thereof. After the system of sets SET is updated, the procedure goes back to Step S2202 (Step S2205). On the other hand, if there is a subset S in which consistency verification in Step S2202 is successful (Step S2203), the consistency verification unit 223-e(v) determines whether the number of members |S|=$N_S$ of the subset S in which consistency verification is successful is greater than or equal to K (Step S2206). If the number of members |S| of any subset S in which the consistency verification is successful is greater than or equal to K, the consistency verification unit 223-e(v) outputs information indicating the subset S (Step S2207); otherwise, the consistency verification unit 223-e(v) terminates the processing with an error message (Step S2208).

Update Example 2

Figure 6B:
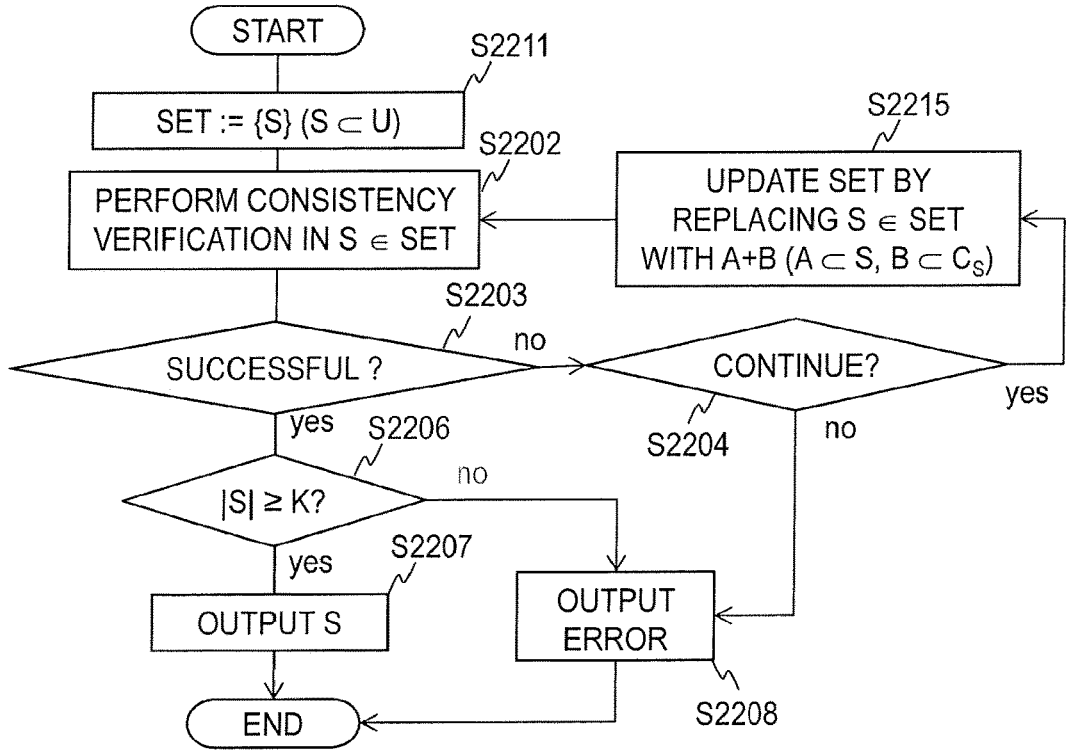
Figure 9A:
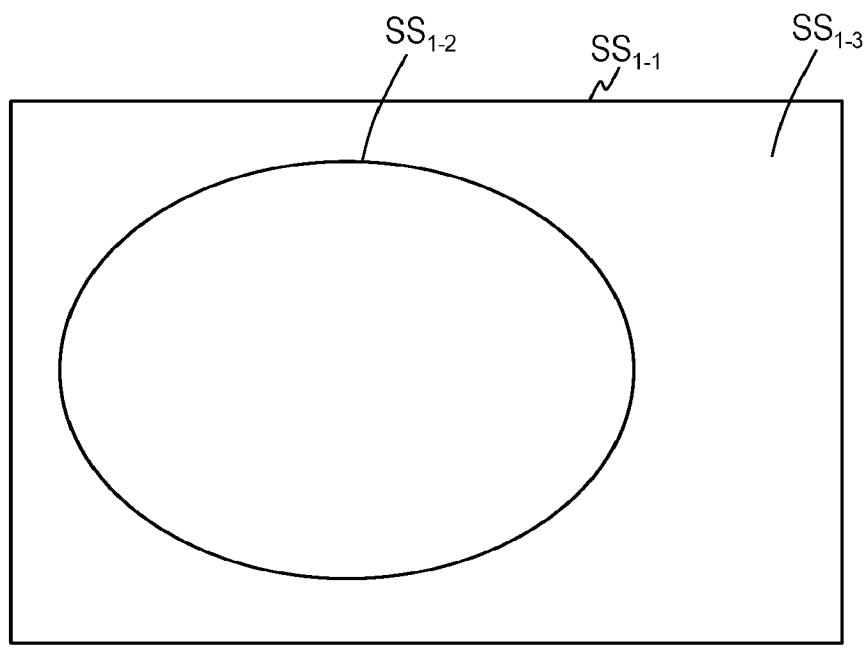
FIGS. 9A and 9B are conceptual diagrams for illustrating processing of the embodiment.
Figure 9B:
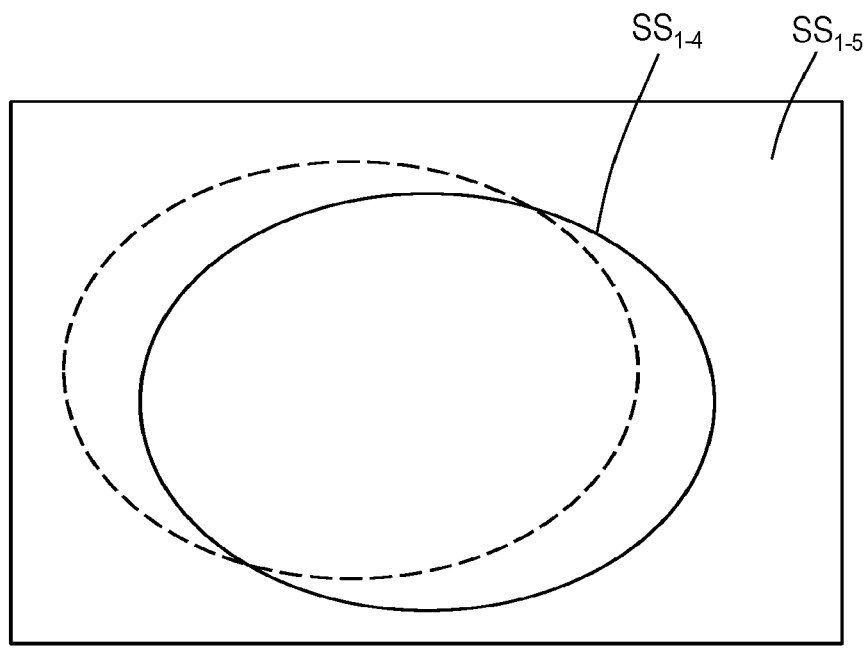
Figure 10A:
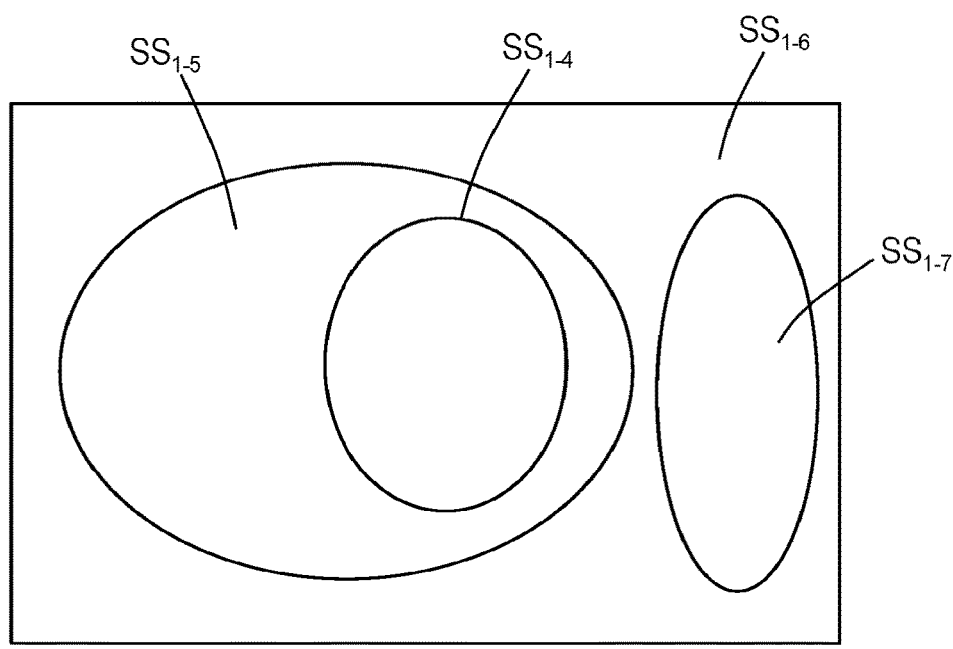
FIGS. 10A and 10B are conceptual diagrams for illustrating processing of the embodiment.
Figure 10B:
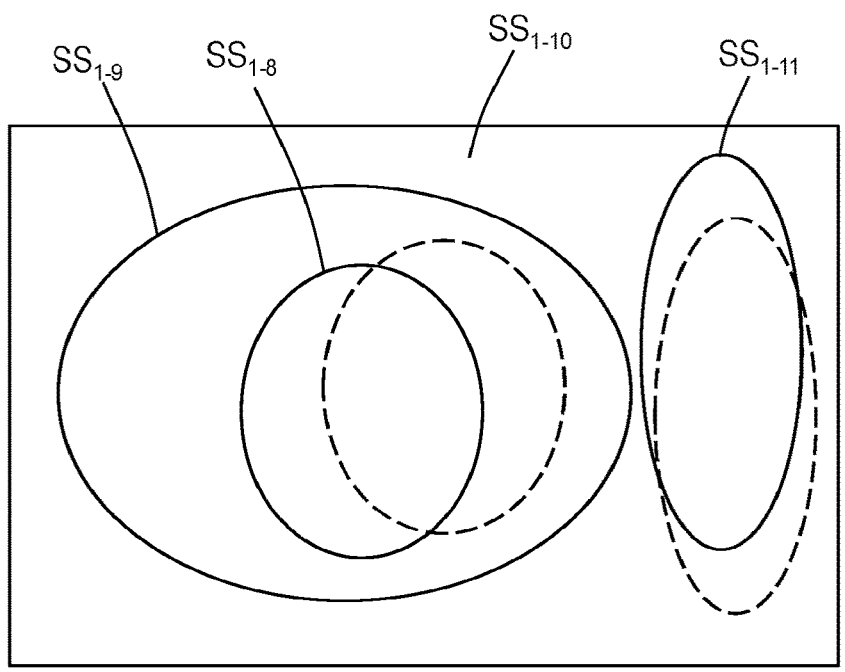

As illustrated in FIG. 6B, in Update example 2, Step S2201 of the processing in FIG. 6A is replaced with S2211 and Step S2205 is replaced with Step S2215. In Step S2211, the consistency verification units 223-n of the N secure computation devices 22-n (n=0, . . . , N−1) set a proper subset of the universal set U as an element of the system of sets SET (SET:={S} (S⊂U)) (Step S2211). In Step S2215, the consistency verification unit 223-e(v) replaces the subset S with a sum set A+B of a proper subset A⊂S of S and a proper subset B⊂$C_S$ of a complementary set $C_S$ of S. For instance, the sum set A+B is a set obtained by shifting the subset S. For example, in an example of FIGS. 9A and 9B, when SET:={$SS_{1-2}$, $SS_{1-3}$}, $SS_{1-2}$ is replaced with a sum set $SS_{1-4}$ and $SS_{1-3}$ is replaced with a sum set $SS_{1-5}$. In an example of FIGS. 10A and 10B, when SET:={$SS_{1-4}$, $SS_{1-5}$, $SS_{1-6}$, $SS_{1-7}$}, $SS_{1-4}$ is replaced with a sum set $SS_{1-5}$, $SS_{1-5}$ is replaced with a sum set $SS_{1-9}$, $SS_{1-6}$ is replaced with a sum set $SS_{1-10}$, and $SS_{1-7}$ is replaced with a sum set $SS_{1-11}$.

Third Embodiment

In a third embodiment, a secure computation device belonging to an "intersection" of a "first set" and a "second set" reconstructs at least one of secret share values of object data and a query or secret share values of the query of a secure computation device belonging to a complementary set of the "intersection" and performs secure computation.

<Configuration>

As illustrated in FIG. 1, a secure computation system 3 of the present embodiment includes a registering device 11, N secure computation devices 32-0, . . . , 32-(N−1), and an analyzing device 13. As illustrated in FIG. 2A, a secure computation device 32-$n$ (n=0, . . . , (N−1)) of the present embodiment includes, for example, a control unit 120-$n$, an input unit 121-$n$, a storage 122-$n$, a consistency verification unit 223-$n$, a secure computation unit 324-$n$, an output unit 125-$n$, and a share value reconstructing unit 326-$n$.

<Processing>

Processing of the present embodiment also includes "registration processing", "storage processing", and "analysis processing". Hereinafter, the processing of the present embodiment will be described by using FIG. 4.

"Registration Processing"

The registering device 11 and the secure computation devices 32-$n$ execute the processing in Step S11 described in the first embodiment. Next, the secure computation device 32-$n$ executes the processing in Step S22 described in the second embodiment.

"Storage Processing"

The secure computation device 32-$n$ executes the processing in Step S23 described in the second embodiment.

"Analysis Processing"

First, the analyzing device 13 and the secure computation devices 32-$n$ execute the processing in Step S14 described in the first embodiment. Next, the secure computation device 32-$n$ executes the processing in Step S25 described in the second embodiment.

If the consistency verification which was performed among the universal set U or the proper subset $S_2$ was successful, share value reconstructing units 326-κ of secure computation devices 32-κ (κ∈{0, . . . , N−1}) belonging to the "intersection ($S_{12}$)" of the above-described "first set (U or $S_1$)" and the above-described "second set (U or $S_2$)" communicate with each other and reconstruct secret share values $[b_0]_θ, \ldots, [b_{M-1}]_θ$ of the object data and the query or secret share values $[q_0]_θ, \ldots, [q_{J-1}]_θ$ of the query of a secure computation device (or secure computation devices) 32-θ (θ∈{0, . . . , N−1} and θ≠κ) belonging to a complementary set of the "intersection ($S_{12}$)". This reconstruction is performed by Lagrange's interpolation, for example. For instance, to a share value reconstructing unit 326-κ' of a particular reliable secure computation device 32-κ' belonging to the "intersection ($S_{12}$)", the share value reconstructing units 326-κ of the other secure computation devices 32-κ belonging to the "intersection ($S_{12}$)" send $[b_0]_κ, \ldots, [b_{M-1}]_κ$ and $[q_0]_κ, \ldots, [q_{J-1}]_κ$. The secure computation device 32-κ' reconstructs $[b_0]_θ, \ldots, [b_{M-1}]_θ$ and $[q_0]_θ, \ldots, [q_{J-1}]_θ$ by Lagrange's interpolation by using them and stores $[b_0]_θ, \ldots, [b_{M-1}]_θ$ and $[q_0]_θ, \ldots, [q_{J-1}]_θ$ in a storage 122-κ' (Step S35).

Each of the secure computation devices 32-κ (κ∈{0, . . . , N−1}) belonging to the "intersection ($S_{12}$)" obtains secret share values $[r_0]_κ, \ldots, [r_{W-1}]_κ$ of the calculation results by performing secure computation in accordance with $[q_0]_κ, \ldots, [q_{J-1}]_κ$ which passed the consistency verification by using $[b_0]_κ, \ldots, [b_{M-1}]_κ$ which passed the consistency verification. Each of the secure computation devices 32-κ holding the reconstructed $[b_0]_θ, \ldots, [b_{M-1}]_θ$ and $[q_0]_θ, \ldots, [q_{J-1}]_θ$ further obtains secret share values $[r_0]_θ, \ldots, [r_{W-1}]_θ$ of the calculation results by performing secure computation in accordance with the reconstructed $[q_0]_κ, \ldots, [q_{J-1}]_κ$ by using the reconstructed $[b_0]_θ, \ldots, [b_{M-1}]_θ$. Also in the present embodiment, secure computation with falsification detection (for example, Reference Literature 2) is used (Step S36). Then, the analyzing device 13 and the secure computation devices 32-$n$ execute the same processing as that performed in Steps S17 and S18 described in the first embodiment. However, $[r_0]_θ, \ldots, [r_{W-1}]_θ$ may be sent to the analyzing device 13 or may not be sent thereto. The processing in Steps S35, S36, S17, and S18 may be executed only when the number of members of the "intersection ($S_{12}$)" is greater than or equal to K which is the required number of secret share values for reconstruction of the calculation results; otherwise, the processing may be terminated with an error message.

Fourth Embodiment

In a fourth embodiment, consistency verification of the secret share values of the object data and consistency verification of the query or the secret share values of the query are collectively performed.

<Configuration>

As illustrated in FIG. 1, a secure computation system 4 of the present embodiment includes a registering device 11, N secure computation devices 42-0, . . . , 42-(N−1), and an analyzing device 13. As illustrated in FIG. 2A, a secure computation device 42-$n$ (n=0, . . . , (N−1)) of the present embodiment includes, for example, a control unit 120-$n$, an input unit 121-$n$, a storage 122-$n$, a consistency verification unit 423-$n$, a secure computation unit 124-$n$, and an output unit 125-$n$.

<Processing>

Processing of the present embodiment also includes "registration processing", "storage processing", and "analysis processing". Hereinafter, the processing of the present embodiment will be described by using FIG. 4.

"Registration Processing"

The registering device 11 and the secure computation devices 42-$n$ execute the processing in Steps S11 and S12 described in the first embodiment. However, in the present embodiment, the processing in Step S12 may be omitted.

"Storage Processing"

The secure computation devices 42-$n$ execute the processing in Step S13 described in the first embodiment. However, in the present embodiment, the processing of consistency verification in Step S13 may be omitted.

"Analysis Processing"

First, the analyzing device 13 and the secure computation devices 42-$n$ execute the processing in Step S14 described in the first embodiment. Next, the consistency verification units 423-$n$ of the N secure computation devices 42-$n$ (n=0, . . . , N−1) communicate with each other and collectively perform consistency verification of the secret share values $[b_0]_n, \ldots, [b_{M-1}]_n$ of the object data and consistency verification of the query or the secret share values $[q_0]_n, \ldots, [q_{J-1}]_n$ of the query. That is, the consistency verification unit 423-$n$ collectively performs consistency verification on $[b_0]_n, \ldots, [b_{M-1}]_n$ and $[q_0]_n, \ldots, [q_{J-1}]_n$. For example, the consistency verification unit 423-$n$ performs consistency verification by the method of Steps S1201 to S1212 described earlier on the assumption that I:=N, i:=n, Y:=M+J, and $([a_0]_i, \ldots, [a_{Y-1}]_i):=([b_0]_n, \ldots, [b_{M-1}]_n, [q_0]_n, \ldots, [q_{J-1}]_n)$. Also in this case, consistency verification of information obtained by disturbing information $([b_0]_n, \ldots, [b_{M-1}]_n, [q_0]_n, \ldots, [q_{J-1}]_n)$ including the secret share values of the object data and the query or the secret share values of the query may be performed. If this consistency verification was successful, $[b_0]_n, \ldots, [b_{M-1}]_n$ and $[q_0]_n, \ldots, [q_{J-1}]_n$ are held in the storage 122-$n$. On the other hand, if this consistency verification failed, $[b_0]_n, \ldots, [b_{M-1}]_n$ and $[q_0]_n, \ldots, [q_{J-1}]_n$ are deleted from the storage 122-$n$, and the processing is returned to Step S11 or terminated with an error message (Step S45). Then, the processing in Steps S16 to S18 of the first embodiment is executed.

It is to be noted that, in place of the consistency verification in Step S25 of the second embodiment or the third embodiment, consistency verification of the secret share values of the object data and consistency verification of the query or the secret share values of the query may be collectively performed. That is, if the consistency verification which was performed among the consistency verification units 423-$n$ of the N secure computation devices 42-$n$ failed, each consistency verification unit 423-$u(\iota)$ of secure computation devices 42-$u(\iota)$ belonging to a proper subset S of a set of the N secure computation devices 42-$n$ (n=0, ..., N-1) may perform consistency verification on $[b_0]_{u(\iota)}, \ldots, [b_{M-1}]_{u(\iota)}$ and $[q_0]_{u(\iota)}, \ldots, [q_{J-1}]_{u(\iota)}$.

[Other Modifications Etc.]

Incidentally, the present invention is not limited to the above-described embodiments. For example, instead of making each device exchange information via a network, at least some sets of devices may exchange information via a portable recording medium. Alternatively, at least some sets of devices may exchange information via a non-portable recording medium. That is, a combination of some of these devices may be the same device. Moreover, each calculation described above may be calculation over a finite field, calculation over an extension field, calculation over a ring, or calculation over other algebraic systems. Furthermore, in place of secure computation with falsification detection, secure computation without a falsification detection function may be performed.

The above-described various kinds of processing may be executed, in addition to being executed in chronological order in accordance with the descriptions, in parallel or individually depending on the processing power of a device that executes the processing or when needed. In addition, it goes without saying that changes may be made as appropriate without departing from the spirit of the present invention.

When the above-described configurations are implemented by a computer, the processing details of the functions supposed to be provided in each device are described by a program. As a result of this program being executed by the computer, the above-described processing functions are implemented on the computer. The program describing the processing details can be recorded on a computer-readable recording medium. An example of the computer-readable recording medium is a non-transitory recording medium. Examples of such a recording medium include a magnetic recording device, an optical disk, a magneto-optical recording medium, and semiconductor memory.

The distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer reads the program stored in the storage device thereof and executes the processing in accordance with the read program. As another mode of execution of this program, the computer may read the program directly from the portable recording medium and execute the processing in accordance with the program and, furthermore, every time the program is transferred to the computer from the server computer, the computer may sequentially execute the processing in accordance with the received program. A configuration may be adopted in which the transfer of a program to the computer from the server computer is not performed and the above-described processing is executed by so-called application service provider (ASP)-type service by which the processing functions are implemented only by an instruction for execution thereof and result acquisition.

In the above-described embodiments, processing functions of the present device are implemented as a result of a predetermined program being executed on the computer, but at least part of these processing functions may be implemented by hardware.

DESCRIPTION OF REFERENCE NUMERALS 1 to 4 secure computation system
11 registering device
12-$n$ to 42-$n$ secure computation device
13 analyzing device

What is claimed is:

1. A secure computation system comprising:
a plurality of secure computation devices, wherein
each of the secure computation devices includes processing circuitry configured to implement:
a storage that stores a first secret share value of object data on which secure computation is to be performed,
an input unit to which a query which requests the secure computation or a second secret share value of the query is input,
a consistency verification unit that performs consistency verification of the first secret share value of the object data and consistency verification of the query or the second secret share value of the query,
a secure computation unit that obtains a third secret share value of a calculation result by performing secure computation in accordance with the query or the second secret share value of the query which passed the consistency verification by using the first secret share value of the object data which passed the consistency verification, and
an output unit that outputs the third secret share value of the calculation result, wherein
the output unit of each of the secure computation devices belonging to an intersection of a first set and a second set outputs the third secret share value of the calculation result, where members of the first set are secure computation devices each storing the first secret share value of the object data which passed the consistency verification, among the plurality of secure computation devices, and members of the second set are secure computation devices each of which the query or the second secret share value of the query which passed the consistency verification was input to, among the plurality of secure computation devices, and at least one of the first set and the second set is a proper subset of a universal set whose members are the plurality of secure computation devices.

2. The secure computation system according to claim 1, wherein each of the secure computation devices belonging to the intersection includes a reconstruction unit that reconstructs at least one of the first secret share value of the object data and the query or the second secret share value of the query of a secure computation device belonging to a complementary set of the intersection.

3. The secure computation system according to claim 1 or 2, wherein each of the output unit of the secure computation devices belonging to the intersection outputs the third secret share value of the calculation result when a number of members of the intersection is greater than or equal to a required number of secret share values for reconstruction of the calculation result.

4. The secure computation system according to claim 1 or 2, wherein the consistency verification unit performs first recurrence processing when the first secret share value of the object data did not pass the consistency verification performed among a first subset of the universal set, and/or performs second recurrence processing when the query or the second secret share value of the query did not pass the consistency verification performed among a second subset of the universal set, the first recurrence processing by which consistency verification of the first secret share value of the object data is performed by using a proper subset of the first subset as the first subset, the second recurrence processing by which consistency verification of the query or the second secret share value of the query is performed by using a proper subset of the second subset as the second subset.

5. The secure computation system according to claim 1 or 2, wherein the consistency verification unit performs third recurrence processing when the first secret share value of the object data did not pass the consistency verification performed among a third subset of the universal set, and/or performs fourth recurrence processing when the query or the second secret share value of the query did not pass the consistency verification performed among a fourth subset of the universal set, the third recurrence processing by which consistency verification of the first secret share value of the object data is performed by using a sum set of a proper subset of the third subset and a subset of a complementary set of the third subset as the third subset, the fourth recurrence processing by which consistency verification of the query or the second secret share value of the query is performed by using a sum set of a proper subset of the fourth subset and a subset of a complementary set of the fourth subset as the fourth subset.

6. A secure computation system comprising:

a plurality of secure computation devices, wherein each of the secure computation devices includes processing circuitry configured to implement:

a storage that stores a first secret share value of object data on which secure computation is to be performed, an input unit to which a query which requests the secure computation or a second secret share value of the query is input, a consistency verification unit that performs consistency verification of the first secret share value of the object data and consistency verification of the query or the second secret share value of the query, a secure computation unit that obtains a third secret share value of a calculation result by performing secure computation in accordance with the query or the second secret share value of the query which passed the consistency verification by using the first secret share value of the object data which passed the consistency verification, and an output unit that outputs the third secret share value of the calculation result, wherein the consistency verification unit includes a combining unit that obtains a combined value s of a plurality of arbitrary values obtained in a subset of a universal set whose members are the plurality of secure computation devices, a linear combination unit that obtains a linear combination value $[c]_i$ of values including at least one of the first secret share value of the object data and the query or the second secret share value of the query by using function values of the combined value s as coefficients, and a verification unit that performs the consistency verification by distributing a fourth secret share value $[d]_i$ corresponding to the linear combination value $[c]_i$ to another secure computation device.

7. The secure computation system according to claim 6, wherein the consistency verification unit includes a disturbed value setting unit that obtains a random number secret share value $[R]_i$, and a disturbing unit that obtains the fourth secret share value $[d]_i$ by disturbing the linear combination value $[c]_i$ with the random number secret share value $[R]_i$.

8. A secure computation device comprising processing circuitry configured to implement:

a storage that stores a first secret share value of object data on which secure computation is to be performed;

an input unit to which a query which requests the secure computation or second secret share value of the query is input;

a consistency verification unit that performs consistency verification of the first secret share value of the object data and consistency verification of the query or the second secret share value of the query;

a secure computation unit that obtains a third secret share value of a calculation result by performing secure computation in accordance with the query or the second secret share value of the query which passed the consistency verification by using the first secret share value of the object data which passed the consistency verification; and an output unit that outputs the third secret share value of the calculation result, wherein
the consistency verification unit includes
a combining unit that obtains a combined value s of a plurality of arbitrary values,
a linear combination unit that obtains a linear combination value $[c]_i$ of values including at least one of the first secret share value of the object data and the query or the second secret share value of the query by using function values of the combined value s as coefficients, and
a verification unit that performs the consistency verification by distributing a fourth secret share value $[d]_i$ corresponding to the linear combination value $[c]_i$ to another secure computation device.

9. The secure computation device according to claim 8, wherein
the consistency verification unit includes
a disturbed value setting unit that obtains a random number secret share value $[R]_i$, and
a disturbing unit that obtains the fourth secret share value $[d]_i$ obtained as a result of the linear combination value $[c]_i$ being disturbed by the random number secret share value $[R]_i$.

10. A secure computation method comprising:
storing, in a storage, a first secret share value of object data on which secure computation is to be performed;
accepting a query which requests the secure computation or a second secret share value of the query;
performing consistency verification of the first secret share value of the object data and consistency verification of the query or the second secret share value of the query;
obtaining a third secret share value of a calculation result by performing secure computation in accordance with the query or the second secret share value of the query which passed the consistency verification by using the first secret share value of the object data which passed the consistency verification; and
outputting the third secret share value of the calculation result, wherein
the performing consistency verification includes:
obtaining a combined value s of a plurality of arbitrary values,
obtaining a linear combination value $[c]_i$ of values including at least one of the first secret share value of the object data and the query or the second secret share value of the query by using function values of the combined value s as coefficients, and
performing the consistency verification by distributing a fourth secret share value $[d]_i$ corresponding to the linear combination value $[c]_i$ to another secure computation device.

11. A non-transitory computer-readable recording medium having stored therein a program for causing a computer to execute a process including:
storing, in a storage, a first secret share value of object data on which secure computation is to be performed;
accepting a query which requests the secure computation or a second secret share value of the query;
performing consistency verification of the first secret share value of the object data and consistency verification of the query or the second secret share value of the query;
obtaining a third secret share value of a calculation result by performing secure computation in accordance with the query or the second secret share value of the query which passed the consistency verification by using the first secret share value of the object data which passed the consistency verification; and
outputting the third secret share value of the calculation result,
wherein
the performing consistency verification includes:
obtaining a combined value s of a plurality of arbitrary values,
obtaining a linear combination value $[c]_i$ of values including at least one of the first secret share value of the object data and the query or the second secret share value of the query by using function values of the combined value s as coefficients, and
performing the consistency verification by distributing a fourth secret share value $[d]_i$ corresponding to the linear combination value $[c]_i$ to another secure computation device.

12. The secure computation system according to claim 3, wherein
the consistency verification unit performs first recurrence processing when the first secret share value of the object data did not pass the consistency verification performed among a first subset of the universal set, and/or performs second recurrence processing when the query or the second secret share value of the query did not pass the consistency verification performed among a second subset of the universal set, the first recurrence processing by which consistency verification of the first secret share value of the object data is performed by using a proper subset of the first subset as the first subset, the second recurrence processing by which consistency verification of the query or the second secret share value of the query is performed by using a proper subset of the second subset as the second subset.

13. The secure computation system according to claim 3, wherein
the consistency verification unit performs third recurrence processing when the first secret share value of the object data did not pass the consistency verification performed among a third subset of the universal set, and/or performs fourth recurrence processing when the query or the second secret share value of the query did not pass the consistency verification performed among a fourth subset of the universal set, the third recurrence processing by which consistency verification of the first secret share value of the object data is performed by using a sum set of a proper subset of the third subset and a subset of a complementary set of the third subset as the third subset, the fourth recurrence processing by which consistency verification of the query or the second secret share value of the query is performed by using a sum set of a proper subset of the fourth subset and a subset of a complementary set of the fourth subset as the fourth subset.

14. The secure computation system according to claim 4, wherein
the consistency verification unit performs third recurrence processing when the first secret share value of the object data did not pass the consistency verification performed among a third subset of the universal set, and/or performs fourth recurrence processing when the query or the second secret share value of the query did not pass the consistency verification performed among a fourth subset of the universal set, the third recurrence processing by which consistency verification of the first secret share value of the object data is performed by using a sum set of a proper subset of the third subset and a subset of a complementary set of the third subset as the third subset, the fourth recurrence processing by which consistency verification of the query or the second secret share value of the query is performed by using a sum set of a proper subset of the fourth subset and a subset of a complementary set of the fourth subset as the fourth subset.

15. The secure computation system according to claim 3, wherein
the consistency verification unit includes
   a combining unit that obtains a combined value s of a plurality of arbitrary values obtained in a subset of a universal set whose members are the plurality of secure computation devices,
   a linear combination unit that obtains a linear combination value $[c]_i$ of values including at least one of the first secret share value of the object data and the query or the second secret share value of the query by using function values of the combined value s as coefficients, and
   a verification unit that performs the consistency verification by distributing a fourth secret share value $[d]_i$ corresponding to the linear combination value $[c]_i$ to another secure computation device.

16. The secure computation system according to claim 4, wherein
the consistency verification unit includes
   a combining unit that obtains a combined value s of a plurality of arbitrary values obtained in a subset of a universal set whose members are the plurality of secure computation devices,
   a linear combination unit that obtains a linear combination value $[c]_i$ of values including at least one of the first secret share value of the object data and the query or the second secret share value of the query by using function values of the combined value s as coefficients, and
   a verification unit that performs the consistency verification by distributing a fourth secret share value $[d]_i$ corresponding to the linear combination value $[c]_i$ to another secure computation device.

17. The secure computation system according to claim 5, wherein
the consistency verification unit includes
   a combining unit that obtains a combined value s of a plurality of arbitrary values obtained in a subset of a universal set whose members are the plurality of secure computation devices,
   a linear combination unit that obtains a linear combination value $[c]_i$ of values including at least one of the first secret share value of the object data and the query or the second secret share value of the query by using function values of the combined value s as coefficients, and
   a verification unit that performs the consistency verification by distributing a fourth secret share value $[d]_i$ corresponding to the linear combination value $[c]_i$ to another secure computation device.

* * * * *